(12) United States Patent
Umblijs et al.

(10) Patent No.: US 7,873,535 B2
(45) Date of Patent: Jan. 18, 2011

(54) METHOD AND SYSTEM FOR MODELING MARKETING DATA

(75) Inventors: Andris Umblijs, Surrey (GB); James Walker, Chesire (GB); Jeffrey Merrihue, London (GB)

(73) Assignee: Accenture Global Services Ltd. (IE)

( * ) Notice: Subject to any disclaimer, the term of this patent is extended or adjusted under 35 U.S.C. 154(b) by 1229 days.

(21) Appl. No.: 11/483,401

(22) Filed: Jul. 7, 2006

(65) Prior Publication Data

US 2007/0106550 A1 May 10, 2007

Related U.S. Application Data

(63) Continuation of application No. 11/267,926, filed on Nov. 4, 2005, now abandoned.

(51) Int. Cl.
*G06F 17/30* (2006.01)
(52) U.S. Cl. ............... 705/10; 705/7; 705/8; 705/9
(58) Field of Classification Search ............... 705/7, 705/10
See application file for complete search history.

(56) References Cited

U.S. PATENT DOCUMENTS

| 7,006,979 | B1 * | 2/2006 | Samra et al. | 705/10 |
| 2003/0018517 | A1 * | 1/2003 | Dull et al. | 705/10 |
| 2004/0204975 | A1 * | 10/2004 | Witting | 705/7 |

OTHER PUBLICATIONS

"MMA—Avista by MMA DSS" (http://www.mma.com/avistabymma.htm); Dec. 12, 2005.

"Avista Decision Support Service" (http://www.mma.com/whitepapers/avistadss.pdf); Feb. 22, 2005.

John Koza: "A Genetic Approach To Econometric Modeling" (http://citeseer.ist.psu.edu/koza90genetic.html); Aug. 20, 2004.

Your Partner In Performance Management (/http://www.symphonyrpm.com/platform/SymphonyRPMCorporate%20Brochure.pdf); May 20, 2005.

B. Wierenga et al., "The Success of Marketing Management Support Systems" (/http://pubsonline.informs.org/main/pdfstore/556172a8c5_article.pdf) Jun. 13, 2004.

T. Ambler et al, "Improving Marketing Productivity: Introducing the HAMRAT process" (http://facultyresearch.london.edu/docs/02-901.pdf) May 2002.

(Continued)

*Primary Examiner*—R. D Rines
(74) *Attorney, Agent, or Firm*—Fish & Richardson P.C.

(57) ABSTRACT

A method for automatically processing marketing and sales information. The method includes receiving data relating to one or more products, including data pertaining to marketing performance of the products and the marketing input drivers that influence the marketing performance. The method also includes analyzing the received data to determine response curves for the products, the response curves representing an optimal fit between a weighted combination of the input drivers of the products and their respective performance data. The method further includes adjusting the response curves based on feedback from one or more analysts to predict the future behavior of the response curves, determining an allocation of marketing resources based on the adjusted response curves, and presenting to a user the received data, the determined response curves, the adjusted response curves, and/or the marketing resources allocation.

17 Claims, 15 Drawing Sheets

OTHER PUBLICATIONS

J. Armstrong, "Forecasting Methods For Marketing: Review of Empirical Research" (http://repository.upenn.edu/cgi/viewcontent.cgi?article=1080&context=marketing_papers) 1988.

Shrivastava. "Optimizing Advertising Budgets & Estimating Return on Investments", School of Broadcasting & Communication, 2003. Retrieved from the Internet <URL: http://www.sbc.ac.in/PDFs/Advertising_Budget_Setting.pdf>.

Bruce McCarl. "Problem set #1: Calculus of Optimization". Last modified Nov. 22, 2004. Retrieved from the Internet <URL: http://agecon2.tamu.edu/people/faculty/elbakidze-levan/problemset1.doc>.

Author unknown. "Avista Decision Support Service: Move from backward looking measurement to forward looking management of marketing ROI". Marketing Management Analytics, Earliest located publication date: Feb. 22, 2005. Retrieved from the Internet <URL: http://www.mma.com/avistadss.htm>.

Author unknown. "Measuring and Optimizing Marketing ROI—Marketing Sandbox". ImmediateFX, Published Sep. 7, 2005. Retrieved from the Internet <URL: http://www.immediatefx.com/>.

Author unknown. "DTC ROI Analysis". marketRx, Published Oct. 27, 2005. Retrieved from the Internet <URL: http://www.marketrx.com/Solutions/featuredsolution15.asp>.

Kaboudan. "Time Series Genetic Programming Software". Publication date 2003. Retrieved from the Internet <URL: http://bulldog2.redlands.edu/fac/mak_kaboudan/Instructions.htm>.

Czarnitzki et al. Genetic Algorithms: A tool for optimization in econometrics—basic concept and an example for empirical applications (abstract only). ZEW Publikationen—Discussion Paper No. 02-41, Mannheim, 2002. Retrieved from the Internet <URL: http://www.zew.de/de/publikationen/publikation.php3?action=detail&nr=1521>.

Ramirez et al. "Choosing variables with a genetic algorithm for econometric models based on neural networks learning and adaptation". Society for Computational Economics No. 246, Aug. 11, 2004. Retrieved from the Internet <URL: http://ideas.repec.oru/p/sce/scecf4/246.html>.

Teasley. "Marketing Mix Modeling". Publication date: Dec. 17, 2003. Retrieved from the Internet <URL: http://www.teasley.net/mixmodel.pdf>.

Stacy. "Marketing Mix Model". Last modified Apr. 28, 2004. Retrieved from the Internet <URL: http://caabi.ba.ttu.edu/Paper/Stacy/MarketingMixWhitepaper.htm>.

Wierenga et al. "The Success of Marketing Management Support Systems". Marketing Science 18(3):196-207, 1999.

Ambler et al. "Improving Marketing Productivity: Introducing the HAMRAT process". Centre for Marketing Working Paper No. 02-901, May 2002.

Maughan. "Marketing Mix Simulator". Cozmix, Copyright 2005. Retrieved from the Internet <URL: http://stevemaughan.com/cozmix/MixModel2.swf>.

Shrivastava. "Optimizing Advertising Budgets & Estimating Return on Investments", School of Broadcasting & Communication, 2003. Retrieved from the Internet <URL: http://www.sbc.ac.in/PDFs/Advertising_Budget_Setting.pdf>.

Author unknown. "Problem set #1: Calculus of Optimization". Publication date unknown. Retrieved from the Internet <URL: http://agecon2.tamu.edu/people/faculty/elbakidze-levan/problemsetl.doc>.

Author unknown. "Avista Decision Support Service: Move from backward looking measurement to forward looking management of marketing ROI". Marketing Management Analytics, Publication date unknown. Retrieved from the Internet <URL: http://www.mma.corn/avistadss.htm>.

Author unknown. "Measuring and Optimizing Marking ROI—Marketing Sandbox". ImmediateFX, publication date unknown. Retrieved from the Internet <URL: http://www.immediatefx.com/>.

Author unknown. "DTC ROI Analysis". marketRx, publication date unknown. Retrieved from the Internet <URL: http://www.marketrx.com/Solutions/featuredsolution15.asp>.

Kaboudan. "Time Series Genetic Programming Software". Publication date unknown. Retrieved from the Internet <URL: http://bulldog2.redlands.edu/fac/mak_kaboudan/Instructions.htm>.

Czarnitzki et al. Genetic Algorithms: A tool for optimization in econometrics—basic concept and an example for empirical applications (abstract only). ZEW Publikationen—Discussion Paper No. 02-41, Mannheim, 1999. Retrieved from the Internet <URL: http://www.zew.de/de/publikationen/publikation.php3?action=detail&nr=1521>.

Ramirez et al. "Choosing variables with a genetic algorithm for econometric models based on neural networks learning and adaptation". Society for Computational Economics No. 246, 2004. Retrieved from the Internet <URL: http://ideas.repec.org/p/sce/scecf4/246.html>.

Teasley. "Marketing Mix Modeling". Publication date unknown. Retrieved from the Internet <URL: http://www.teasley.net/mixmodel.pdf>.

Stacy. "Marketing Mix Model". Publication date unknown. Retrieved from the Internet <URL:http://caabi.ba.ttu.edu/Paper/Stacy/MarketingMixWhitepaper.htm>.

Wierenga et al. "The Success of Marketing Management Support Systems". Marketing Science 18(3):196-207, 1999.

Ambler et al. "Improving Marketing Productivity: Introducing the HAMRAT process". Centre for Marketing Working Paper No. 02-901, May 2002.

Maughan. "Marketing Mix Simulator". Cozmix, publication date unknown. Retrieved from the Internet <URL: http://stevemaughan.com/cozmix/MixModel2.swf>.

Canadian Examiner's Report for Application No. 2,566,930 dated May 5, 2010 (4 pages).

* cited by examiner

FIG. 13

METHOD AND SYSTEM FOR MODELING MARKETING DATA

RELATED APPLICATIONS

This application is a continuation application and claims priority to U.S. application Ser. No. 11/267,926, entitled "Modeling Marketing Data", and filed Nov. 4, 2005 now abandoned, the contents of which are incorporated herein in their entirety.

TECHNICAL FIELD

This invention relates to modeling marketing data.

BACKGROUND

Economic outcomes, such as sales performance, resulting from marketing actions applied on products and services are generally difficult to predict. Such outcomes can depend on many variables, including general marketing conditions (e.g., consumers' trends), environmental conditions, actions taken by competitors, allocation of resources, strategies pursued in advancing the economic goals, etc. Traditionally, analysts, such as economists and marketing specialists, analyze the data and try to predict the behavior and possible outcomes that would result from pursuing certain courses of actions.

However, even under the best of circumstances, analysts typically only focus on a relatively small subset of marketing variables (sometimes referred to as market drivers) when trying to articulate appropriate marketing strategies and courses of action to follow when marketing particular products and/or services. Furthermore, the formulation of marketing strategies and the methodologies used to arrive at such formulations are generally ad hoc, and a near-form of art.

Although some computer-based applications that facilitate analysis of marketing data are available, such computer-based applications offer only limited help and do not facilitate the entire process of creating viable marketing models, and formulating appropriate marketing strategies based on such models.

SUMMARY

In one aspect, the invention includes a method for identifying how market drivers affect sales performance data. The method includes accepting historical data that includes market data associated with a plurality of market drivers, and sales performance data relating to one or more products. The method also includes generating a model relating the market drivers and the sales performance data according to the historical data and a fitness function, including, selecting a subset of the market drivers, and estimating coefficients of the model characterizing a relationship between the selected market drivers and the sales data.

Embodiments may include one or more of the following:

Generating the model includes producing a plurality of candidate marketing models, and applying the fitness function to the plurality of candidate marketing models to identify the optimal model. The generated model is the optimal model.

Producing the candidate marketing models is performed as part of a genetic algorithm approach.

The subset of market input drivers correspond to, for example, a geographical region, a product, and/or marketing channels.

Generating a model further includes imposing constraints on the model. The constraints include, for example, statistical goodness of fit, allowable range for a model coefficient, and/or a constraint on the marginal response to a market driver.

The method further includes accepting user input corresponding to, for example, the constraints, and/or the subset of market drivers.

The method further includes augmenting the historical data by performing mathematical transformation on the market drivers.

The method further includes generating response curves that establish a relationship between one or more market drivers and the performance data corresponding to, for example, a product, a geographical region, and/or marketing channels.

The fitness function represents, for example, a statistical test, and/or marketing-related constraints.

Some of the plurality of market drivers represent relationships between two or more of the plurality of market drivers. The relationships between two or more of the plurality of market drivers include, for example, a beneficial effect of one market driver on another market driver, and/or an adverse effect of one market driver on another market driver. The relationships between two or more of the plurality of market drivers correspond, for example, to a particular product, and/or two or more different products.

In another aspect, the invention includes a method for adjusting a model relating market data and sales performance data. The method includes accepting historical response curves estimated from the model. The method also includes generating predicted response curves from the accepted response curves, including, a) for at least some market drivers corresponding to the estimated historical response curves, determining at least one scale parameter associated with the market drivers based on the input of at least one user, and b) combining the scale parameters to compute the predicted response curves.

In another aspect, the invention includes a method for determining allocation of marketing resources. The method includes accepting a model that relates market data and sales performance data, determining a plurality of response curves based on the model, each of the response curves representative of the effect a corresponding market driver associated with the model has on the sales performance data. The method also includes determining the relationship between one market driver and another market driver, and determining the optimal allocation of marketing resources based on, for example, the plurality of the response curves, and the relationships of the market drivers.

In another aspect, the invention includes a method for automatically processing marketing and sales information. The method includes receiving data relating to one or more products, the data includes data pertaining to at least one of the marketing performance of the one or more products, and the marketing input drivers that influence the marketing performance of the one or more products. The method also includes analyzing the received data to determine one or more response curves for each of the one or more products, the one or more response curves representing an optimal fit between a weighted combination of the marketing input drivers corresponding to the one or more products and the respective performance data of the one or more products. The method further includes adjusting the determined one or more response curves based on feedback from one or more analysts to predict the future behavior of the one or more response curves, determining an allocation of marketing resources based on the adjusted one or more response curves, and presenting to a user at least one of: the received data, the determined one or more response curves, the adjusted one or more response curves, and the marketing resources allocation.

In another aspect, the invention includes a computer-readable medium storing computer instructions that when executed on a processor-based device cause the processor-based device to accept historical data that includes market data associated with a plurality of market drivers, and sales performance data relating to one or more products. The computer instructions also cause the processor-based device to generate a model relating the market drivers and the sales performance data according to the historical data and a fitness function, including, select a subset of the market drivers, and estimate coefficients of the model characterizing a relationship between the selected market drivers and the sales data.

In another aspect, the invention includes a computer-readable medium storing computer instructions that when executed on a processor-based device cause the processor-based device to accept historical response curves estimated from a model relating historical market data and sales performance data. The computer instructions also cause the processor-based device to generate predicted response curves from the accepted response curves, including: a) for at least some market drivers corresponding to the estimated historical response curves, determine at least one scale parameter associated with the market drivers based on the input of at least one user, and b) combine the scale parameters to compute the predicted response curves.

In another aspect, the invention includes a computer-readable medium storing computer instructions that when executed on a processor-based device cause the processor-based device to accept a model that relates market data and sales performance data, determine a plurality of response curves based on the model, each of the response curves representative of the effect a corresponding market driver associated with the model has on the sales performance data. The computer instructions also cause the processor-based device to determine the relationship between one market driver and another market driver, and determine the optimal allocation of marketing resources based on at least of one: the plurality of the response curves, and the relationships of the market drivers.

In another aspect, the invention includes a computer-readable medium storing computer instructions that when executed on a processor-based device cause the processor-based device to receive data relating to one or more products, the data includes data pertaining to at least one of the marketing performance of the one or more products, and the marketing input drivers that influence the marketing performance of the one or more products. The computer instructions also cause the processor-based device to analyze the received data to determine one or more response curves for each of the one or more products, the one or more response curves representing an optimal fit between a weighted combination of the marketing input drivers corresponding to the one or more products and the respective performance data of the one or more products. The computer instructions also cause the processor-based device to adjust the determined one or more response curves based on feedback from one or more analysts to predict the future behavior of the one or more response curves, determine an allocation of marketing resources based on the adjusted one or more response curves, and present to a user at least one of: the received data, the determined one or more response curves, the adjusted one or more response curves, and the marketing resources allocation.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 13 is a screenshot of an exemplary dashboard reporting interface.

Like reference symbols in the various drawings indicate like elements.

DETAILED DESCRIPTION

Overview

Figure 1:
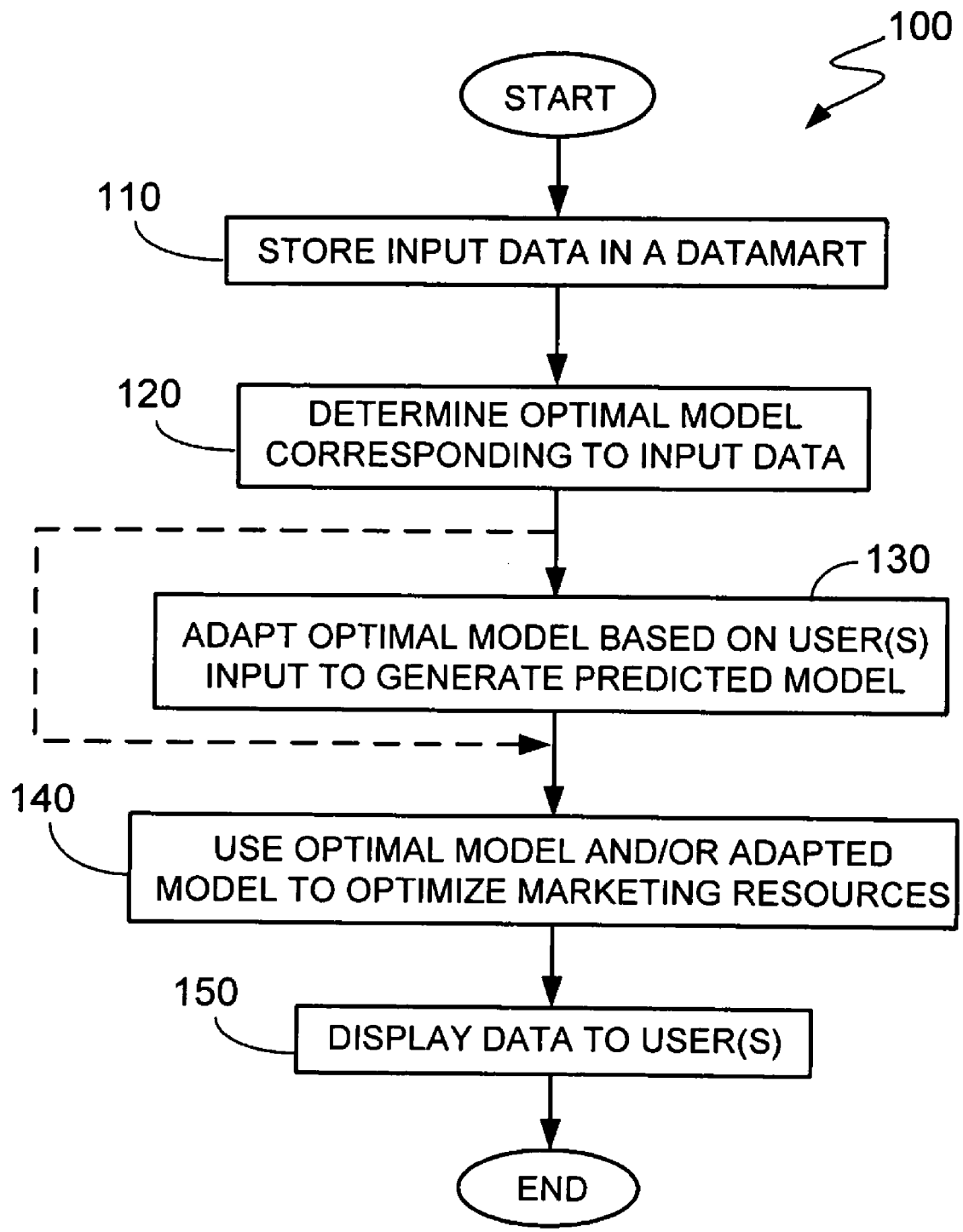
FIG. 1 is a flowchart of an exemplary procedure for modeling and processing marketing data.

Referring to FIG. 1, an overall procedure 100 involves generating marketing models and optionally performing further refinement of the models and then using the models for making marketing decisions. A party using the procedure 100, which uses input data that is stored in a datamart (at 110), to make the marketing decisions. The data used by in the procedure includes historical data corresponding to marketing actions the party has taken in the past, and the corresponding historical sales performance data that resulted from such actions. The historical data of past marketing actions is referred to below at times as input market driver data. Such data include time-series data (i.e., temporal data associated with particular time instances or time intervals, such as daily, weekly, or monthly samples or totals). In addition, third-party data, such as market research data, is also stored on the datamart.

Subsequently, the data stored in the datamart is used to determine an statistical model (at 120) that relates the input market driver data, as well as other available data (such as the third-party data) to the available historical sales performance data. As will be described in more detail below, the determination of the statistical model is performed using an iterative procedure that generates candidate models and selects promising models from those candidate models until a final "optimal" (that is, optimized and typically near optimal but not necessarily mathematically optimal) model is determined.

The determined optimal model relates historical market driver data to historical sales performance data. The model makes is characterized by a model structure and a number of estimated coefficients. The model structure is configured before the process begins, and the coefficients are chosen ("estimated") so that the model best related the market driver data and the sales performance data.

The optimal model can be used to make predictions about future sales performance based on planned or hypothetical market drivers. However, the accuracy of such predictions depends on how much the historical data is characteristic of the upcoming future data. Typically, certain factors have changed such that the same market drivers applied in the future may have greater or lesser effects on sales outputs. Thus, to better use the optimal model to make future marketing predictions it is possible to adapt the optimal model to existing or changing marketing conditions. Accordingly, at 130 the optimal model is adapted to predict future marketing behavior based on input from users responding to sets of survey questions, which provide the raw information based on which model parameters are changed to better predict the future relationship between market drivers and sales performance.

The adaptation of the model is based on input provided by users who provide their opinions on how the optimal model's performance would change in response to a change of the model's variables. The input provided by the users includes answers to basic questions corresponding to the factors that influence the behavior of the market drivers (or variables) of the model. The users' answers are then used to determine scaling factors by which to scale the model's variables.

The predicted model, adapted from the optimal model, is thereafter used to optimize a party's marketing resources, at 140, and thus enable the party to choose future marketing courses of action. As shown in FIG. 1, a party may also use its determined optimal model (i.e., the model based on historical data) to determine marketing resources optimization. However, because the optimal model pertains to past events, use of that model for marketing resources optimization is typically done for simulation and case study purposes.

The data generated by the procedure 100, including the historical data, data corresponding to the various generated models (e.g., response curves showing the marginal response of a model to a single market driver), and data corresponding to the market resource optimization, may be displayed on user interfaces. As will be described in more details below, user interfaces, referred to as dashboards, are adapted to present data in a manner that enables a user to efficiently and quickly glean pertinent information from the interfaces. Additionally, the dashboard interfaces enable a user to control the marketing resources optimization procedure.

Figure 2:
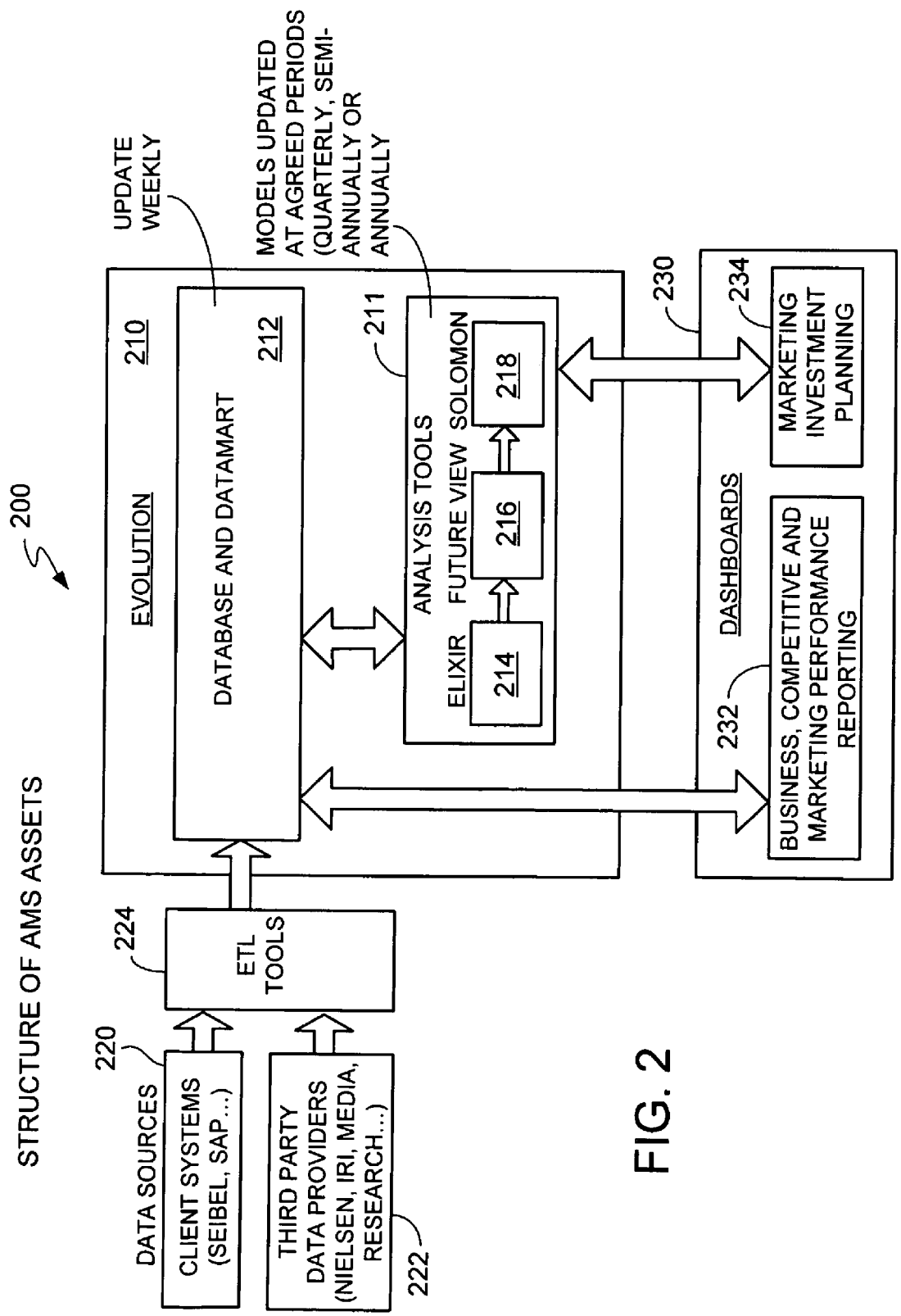
FIG. 2 is a block diagram of an exemplary system for automatically generating marketing models and performing post-model processing and analysis.

FIG. 2 is a block diagram of an exemplary system 200 that implements the procedure 100 illustrated in FIG. 1. The system 200 automatically generates marketing models and performs further processing and analysis using the models. As shown, the system 200 includes the Evolution system 210 that facilitates the development and subsequent use of marketing model(s) pertaining to one or more products sold, or services offered by a party. The system 210 is configured to receive data and generate marketing models for multiple parties. The system 210 guides and assists a user through the various stages involved in the development of one or more marketing models.

The system 210 includes a database and datamart 212 (often referred to below only as the datamart) which stores input data received from client systems 220, as well as data from other third party data providers 222. The data from client system 220 includes the underlying data corresponding to the products and/or services with respect to which one or more models are to be generated. Data received from client system 220 provides historical information about the marketing drivers that impact the marketing behavior for the corresponding products and/or services of that client (party). For example, the data include advertising expenditures, size and deployment of the sales force, etc. Data provided from client system 220 also includes historical sales and performance data for the products and services to be analyzed. Client system 220 further provides all types of client data that affect the performance of the client's marketing of its products and/or services, including manufacturing capacity, inventory levels, etc.

A client's own data is supplemented with data provided by third-party data providers who collect data regarding performance of products and services of different parties. Third-party data providers also collect and compile general marketing-research data. Third-party data can thus include market-share information, information about consumers' trends and preferences, information about the performance of competitors' products and services, etc. Examples of some third party data providers include Nielson Media Research and Information Resources Inc. (IRI).

Data collected by the client systems 220 and by third party data providers 222 is sent to ETL (Extract-Translate-Load) tools module 224. The ETL module processes the data received to format and assemble the data into records compatible with the various systems comprising the Evolution system 210. Once processed, the assembled data records are forwarded to the database and datamart 212, whereupon the received data records are stored.

Once stored, the analysis tools suite 211 is executed to use the available data to determine optimal models, adapt those models to enable them to predict future marketing behavior and performance, and use the adapted models and/or the optimal models to optimize marketing resources and thus determine appropriate marketing actions.

More particularly, as shown in FIG. 2, the Elixir model generation module 214 (hereinafter the "Elixir module 214") receives data from the database and datamart 212 and performs an iterative procedure, as will be described in more detail below, to select an optimal model from multiple candidate models that the module 214 generates. An optimal model created by the Elixir module 214 corresponds to one or more products and/or services, in this version of the system, represented as a scalar representation of sales performance. That is, the model provides a mapping between a number of market drivers (e.g., marketing expenditure in dollars) and a sales performance outcome (e.g., sales in dollars). The model typically is also restricted or relevant to a particular geographic locale in which the products and/or services are sold or offered, or may even correspond to a particular market channel. Thus, the Elixir module 214 may determine a plurality of optimal models, each corresponding to different products, services, geographic locales, and/or market channels. The optimal models are then stored in the database and datamart 212. As discussed further below, when selecting models from amongst generated candidate models, the Elixir module 214 uses a fitness function to evaluate and rank the candidate models.

Once a particular optimal model, corresponding to particular products and/or services, is determined, the FutureView model adaptation module 216 (hereinafter the "FutureView module 216") is used to adjust the optimal model to current and/or future anticipated market conditions. The FutureView module 216 makes adjustments to individual model coefficients (typically associated with particular market drivers) of the model. The FutureView module 216 determines a change to the marginal response (represented graphically by a response curve) of the sales performance predicted by the model given a change to the market conditions affecting a particular market variable, and adjusts the coefficient of that market variable. That adjustment is also reflected by the generation of a predicted response curve corresponding to that market variable. The module 216 makes such a determination based on input from one or more users who are asked to make prediction about how a number of well-defined factors corresponding to a particular market variable might affect the future impact of that market variable on the performance of the model. The responses of the users are then used to determine a scaling factor that is used to adjust the coefficient of the market variable. The FutureView module 216 subsequently adjusts the coefficient, or some other parameter, that controls the contribution of that market variable to the behavior of the model. After making similar adjustments to the optimal model's other market variables, a modified (i.e., adapted) predicted model is obtained. That predicted model is then stored in database and datamart 212.

After a predicted model(s) has been determined, the Solomon marketing resources optimization module 218 (hereinafter the "Solomon module 218") is used to determine an optimal solution for the allocation of marketing resources. The Solomon module 218 determines, subject to a set of constraints, a marketing resources optimization by determining how to best allocate incremental portions of the available marketing resources. The Solomon module 218 examines the marginal response, using, for example, response curves, to identify the best marginal response for a particular incremental change to the overall marketing investment. That is, the Solomon module 218 determines which market variable would result in the best marginal performance response if that market variable was to receive the incremental change to the marketing investment. The Solomon module 218 thus implements an iterative procedure that determines the optimal total budget for marketing activities, and identifies the optimal allocation of the determined total budget to various marketing activities.

As further shown in FIG. 2, data, including response curves, input market driver data, performance data, and other items of data stored on database and datamart 212, can be presented to a user through a reporting interface 232 of the dashboard 230. The dashboard 230 also includes a marketing investment planning interface 234 that enables user to interact with the Solomon module 218. The users are thus able to use the interface 234 to specify constraints for the optimization process performed by the Solomon module 218, and run simulations and test-cases using the Solomon module 218.

As further shown in FIG. 2, the Evolution system 210 initiates at pre-defined intervals (e.g. monthly, quarterly, semi-annually) an analysis of the marketing data stored in database and datamart server 212 using the Elixir module 214, the FutureView module 216, and the Solomon module 218. However, a user using, for example, the dashboard 230, may independently initiate execution of any of these modules, and in particular the Solomon module 218, at any time Each of the various systems and modules shown in FIG. 2 is a processor-based device that includes a computer and/or other types of processor-based devices suitable for multiple applications. Such devices can include volatile and non-volatile memory elements, and peripheral devices to enable input/output functionality. Such peripheral devices include, for example, a CD-ROM drive and/or floppy drive, or a network connection, for downloading software containing computer instructions to enable general operation of the respective system/device, and for downloading software implemented programs to perform operations in the manner that will be described in more detailed below with respect to the various systems and modules shown in FIG. 2.

Further, the various systems and modules comprising system 200 are connected using conventional network arrangements. For example, the various systems and modules of system 200 may constitute part of a private packet-based network. Other types of network communication protocols may also be used to communicate between the various systems and modules. Alternatively, the systems and modules may each be connected to network gateways that enable communication via a public network such as the Internet. Each of the systems and modules of system 200 may, under those circumstances, include security features, such as a firewall and authentication applications, to ensure secured communication. Network communication links between the systems and modules of system 200 may be implemented using wireless or wire-based links. Further, dedicated physical communication links, such as communication trunks may be used. At least some of the various systems described herein may be housed on a single processor-based device (e.g., a server) configured to simultaneously execute several applications.

Figure 3:
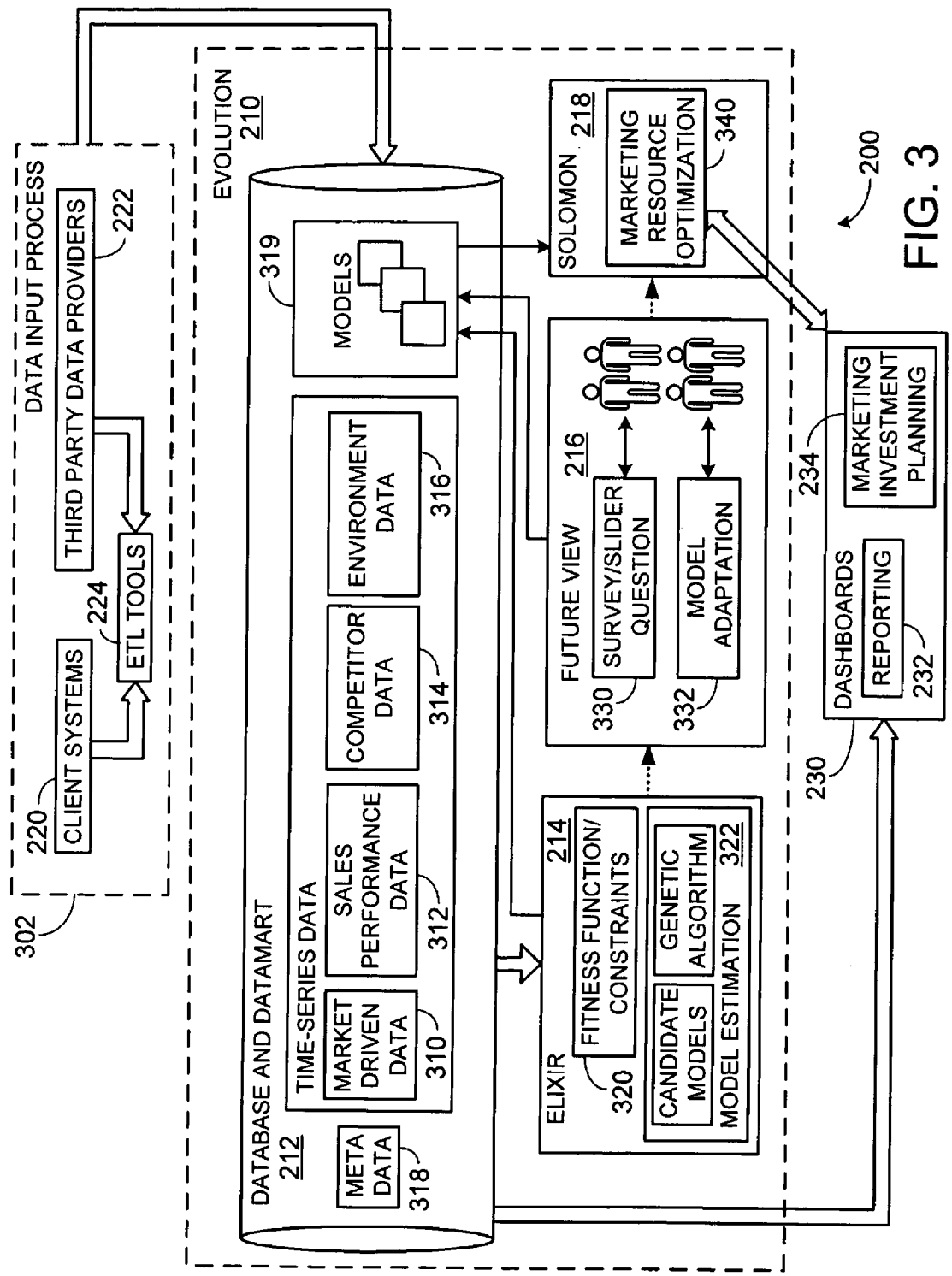
FIG. 3 is a detailed schematic diagram of the system shown in FIG. 2.

FIG. 3 is a schematic diagram showing in greater detail the features of the systems and modules of the Evolution system 210 and dashboard 230 shown in FIG. 2. A detailed discussion of each of the various systems and modules comprising the Evolution system 210 and dashboard 230 follows.

Database and Datamart

As shown in FIG. 3, the database and datamart 212 arranges and stores the data it receives into four data groups maintained in the time-series data group of 308. The time-series data group generally stores temporal input data. Thus, data records placed in the various groups of time series data group 308 are generally associated with a time instances indicative of when a particular record was generated, or at what time the event described in the record took place. As shown, the data groups in the time-series data group 308 include the market driver data group 310. That group includes data records corresponding to the data received from the client's own system (i.e., data received from client systems 220). The market driver data are historical data records that pertain to marketing actions and/or other factors that affect, or could potentially affect, the performance of the client's products and services. As noted above, the market drivers records in group 310 include pricing information records, advertising expenditures, etc. The sales performance data group 312, also shown in FIG. 3, holds the data records pertaining to the performance of the client's products and services in terms of sales volume, sales revenue, etc.

The records in the market driver data group 310 and the sales performance data group 312 include information regarding the time and location associated with the information stored in the respective records. By including time and location information with the various records, the Evolution system 210 is able to determine any correlation between the marketing drivers for particular products and/or services, and the performance for those products and/or services, thereby enabling generation of a marketing model for the products and/or services. The records in data groups 310 and 312 may include additional contextual information to enable more accurate determination of any possible correlation between the market driver records and the performance records.

Database and datamart server 212 also includes the competitor data group 314 which holds records pertaining to performance of competitors' products and services, as well as information about general market conditions. For example, competitor data group 314 includes information about various entities' market share, information about consumers' behavior and trends, etc. As noted above, the data stored in the records placed into group 314 are generally obtained from third-party data providers.

Another data group is environment data group 316, which maintains records pertaining to other exogenous factors that can potentially affect the performance of the client's products and/or services. Data stored in the records of data group 316 can include weather information at particular times and location, information about global affairs (e.g., events affecting the prices of raw resources such as oil and agricultural products), etc.

As also shown in FIG. 3, the database and datamart server 212 also includes meta data group 318. The meta data group 318 stores records that define the interrelation between at least some of the records in the various data groups of datamart 212. For example, meta data records specify subsets of plausible market drivers that affect the performance of certain products and/or services. Thus, such meta data records facilitate the determination of a marketing model by specifying which market drivers should be considered in the model generation process, and which market drivers should be excluded when computing candidate models. For example, if the Evolution system 210 is to be used to generate a marketing model to describe and predict the market performance for car sales in New England, a meta data record could specify plausible market drivers that may contribute to car sales performance in New England (e.g., advertising in publications circulated in New England), and exclude market drivers not likely to be of any relevance to the performance of car sales in New England (e.g., advertising in publications circulated exclusively in California). Alternatively, rather than specifying comprehensive lists of market drivers that could affect the performance of a particular product or service, the meta data records of group 318 could instead specify implausible market drivers that are highly unlikely to affect the performance of the product or service in question. The meta data records stored in group 318 are manually defined by users (e.g., analysts).

Also stored on the database and datamart 212 are the various models generated by the Elixir module 214 and the FutureView module 216. The models are stored in the models data group 319. Other types of data and information may also be stored on the database and datamart 212.

To store and manage the data on the database and datamart 212, the database and datamart 212 may use commercially available applications. Suitable commercial database applications include DB2™ and Oracle™. Alternatively, database and datamart 212 may implement a different data management mechanism for storing and managing data.

The Evolution system 210 may initiate data collection from client systems 220 and third-party data provider 222 at regular intervals, for example, once a week. Other data collection intervals may be used. The Evolution system 210 may initiate such a data collection by sending a request to the client systems 220 and the third-party data provider 222. The data received from those systems (via the ETL tools 224) is then stored in the database and datamart 212.

The Elixir Model Generation Module

In various versions of the system, and possibly for different models within one system, different mathematical forms can be used to map the available market inputs to the sales output at any time. In the version of the system described below, these models have the following properties. First, the models are memoryless in that the sales output at a particular time depends on the market drivers at that time (note that the input data can be augmented, for example, to include delayed versions of input data to account for lagging effects of market drivers on sales outcomes). However, although the models are memoryless, they may nevertheless include input variables that exhibit a memory-like behavior. For example, people often remember and respond to an advertising campaign that has been withdrawn. Thus, in some circumstances it may be desirable to include in the model advertising market drivers (and/or other market drivers) that exhibit a memory-like effect to account for the contribution that an advertising event, or investment, makes even after such an event or investment has been terminated. The use of input variables that have a memory effect is sometimes referred to as the Adstock concept.

Second, the models are generally separable in that the effect of each market driver on the sales outcome is independent and additive. Because the model is separable, the model can be represented as a set of marginal responses of the sales performance on each of the marker drivers. In general when the model is not separable, a model may still have marginal responses to each market driver which depend on a chosen value for the other market drivers. Finally, the model is non-linear (e.g., polynomial) in that a small set of model coefficients characterizes the marginal response of each market driver.

As shown in FIG. 3, the Elixir module 214 includes the fitness function and constraint module 320. The module 320 stores fitness function definitions, as well as constraint definitions, that are used to evaluate candidate models generated by the Elixir module 214. Module 320 thus includes storage, such as volatile or non-volatile memory, for storing one or more fitness functions, and for storing the constraints. The fitness function is used to compute a representative fitness scores (which may be scalar or vector, or set of values) for the candidate models. The resultant fitness scores are then used to select models for further processing, and/or to ultimately select the optimal model that is subsequently used for further analysis and prediction of marketing behavior, and for resource optimization.

The module 320 also maintains information specifying constraints imposed on candidate models. Although a particular candidate model generated and/or evaluated may yield a satisfactory fitness value, the model may nonetheless be impractical or inappropriate if it reflects irrational or impossible market conditions. For example, a model that indicates a decline in sales notwithstanding an increase in advertising expenditures is deemed to be an irrational model since the marginal response to an increase in advertising expenditures should be positive. Thus, a model displaying this type of behavior can be immediately eliminated from further consideration and processing. Another type of constraints that may be used relates to permissible coefficients values (specified as a range) for the various market variables comprising a model. Model having market variables whose coefficients (or other parameters) deviate from a specified coefficient range would be deemed to be inadequate, and thus would be eliminated from further consideration and processing. The constraints are defined by the operators operating the system 200, and may be entered through the dashboard 230, or through some other user-interface for interacting with the system 200. Alternatively, the constraints can be sent from the client systems 220.

As further shown in FIG. 3, the Elixir module 214 includes the model generation and selection module 322. Module 322 receives data from database and datamart 212 and estimates the coefficients of a best model. Although a large number of candidate market drivers are generally available for a model, the model estimation procedure involves both selecting a smaller subset of market drivers that will have an impact on the sales performance and estimation of the model coefficients that characterize the marginal response to each of the selected market drivers. The model generation approach includes iteratively generating multiple candidate models, evaluating the generated models using one or more of the fitness functions defined in module 320, and selecting models that represent the best fit and satisfy the constraints stored on module 320. This process is repeated until an optimal model, relating a selected set of market drivers to the performance data, is identified.

Figure 4:
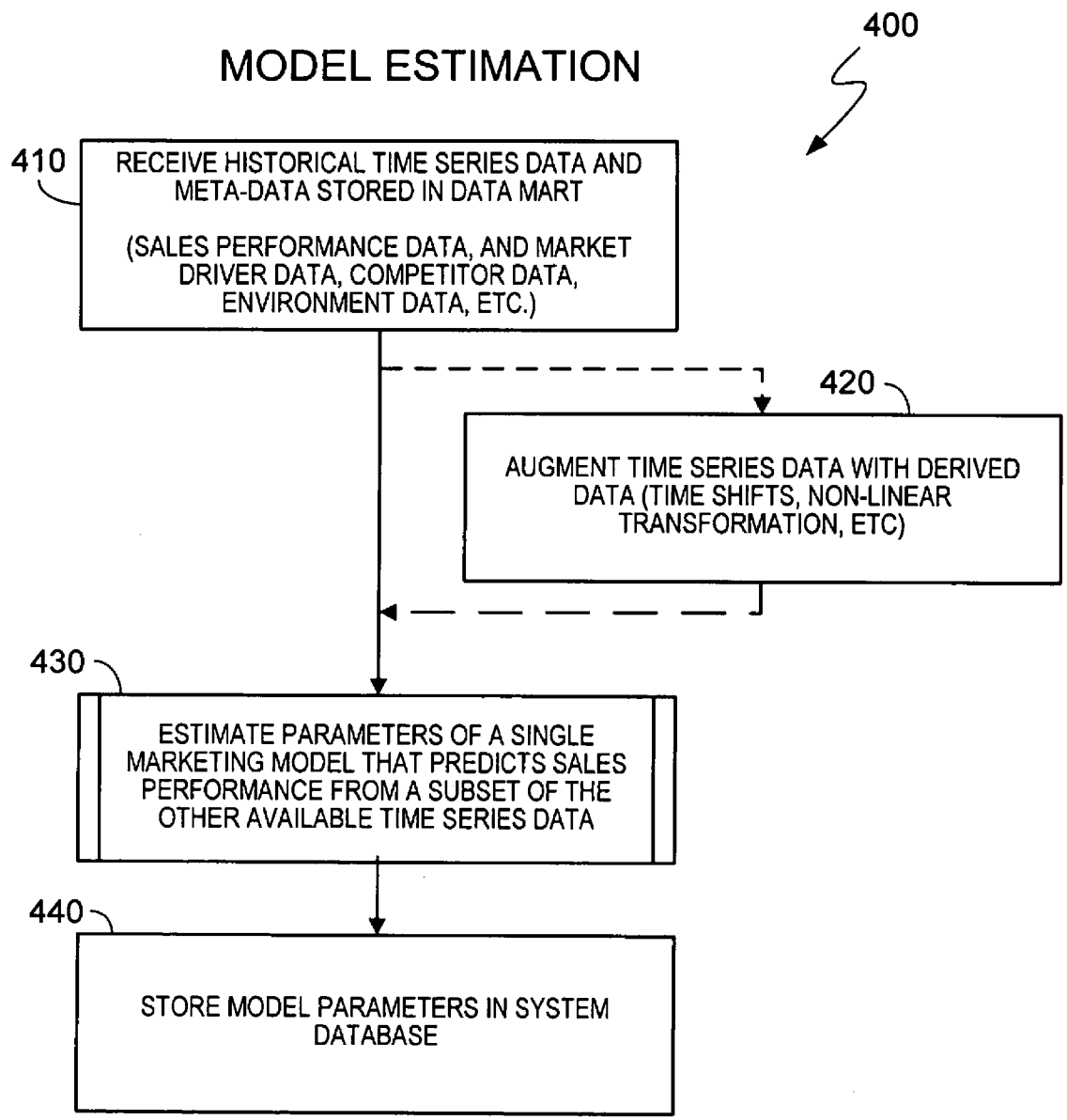
FIG. 4 is a flowchart of an exemplary procedure for generating an optimal marketing model from historical input and performance data.

FIG. 4 is a flowchart of an exemplary procedure 400 for generating an optimal marketing model from the underlying historical input data. As can be seen, the Elixir module 214 receives, at 410, historical input data stored in the database and datamart server 212. The received data includes data from market driver data group 310, data from the sales performance data group 312, data from competitor data group 314, data from environment data group 316, and the meta data records in data group 318.

Optionally, the Elixir module 214 may augment, at 420, the underlying data received from the datamart server 212 with data derived from that underlying data. Such data augmentation enables the Elixir module 214 to more accurately mimic the real marketing behavior represented by the input data to produce a more accurate model. For example, in some circumstances it may be necessary to time shift the underlying data to reflect the fact that the response of the optimal model to a certain event (e.g., a change of temperature conditions in the effected area) may be delayed. Additionally, in some circumstances, it may be necessary to adjust the model to reflect non-linear response to one or more of the market drivers. For example, the model's response should reflect diminishing return effects corresponding to one or more of the model's variables. In other words, the model should reflect the fact that changes to the input of some of the market variable would not result in proportional changes to the output of the model, and that therefore the market model would behave differently over different input ranges of a particular market variable. Also, as noted above, in some circumstances it is desirable to account for the memory effect that some market drivers, such as advertising-based market drivers, may exhibit (i.e., the Adstock concept). The Elixir module 214 may thus derive input data and/or input variables that include the sum of the investments pertaining to the particular market drivers and a memory effect for those market drivers represented as a decaying temporal contribution of the derived market drivers to the models. The Elixir module 214 may generate multiple input variables for a particular market driver, each variable having a different memory decay rate. Thus, at 420 the Elixir module 214 may perform mathematical operations, such as time-shifting, non-linear transformations, etc., on part or all of the underlying data to derive additional data, and/or input variables, that will be used to determine the optimal model.

In addition, the Elixir module 214 may also create input variables that represent possible interrelationships between two or more market drivers corresponding, for example, to the same product. Particularly, in some circumstances two or more market drivers might exhibit inter-dependent behavior such that the presence of one market driver might affect, either adversely or beneficially, the contribution another market driver makes to the overall performance of the model. For example, two separate market drivers, such as TV advertising and sponsorship might, when combined, have a synergetic effect on the marketing performance of the product being modeled such that increased TV spending might spur increased effectiveness of sponsorship for the product in question (such a synergetic effect is sometimes referred to as the "Halo Effect").

The Elixir module 214 may also create input variables representing interrelationships between two or more products for which a model is to be determined. Here too, the contribution and behavior of one market driver might affect, either adversely or beneficially, the contribution another market driver, corresponding to a different product, would have on the marketing performance for that other product. For example, a promotion such as "buy one get one free" for product A might improve the marketing performance for product A, but on the other hand might adversely affect the marketing performance of product B. Under such circumstances, the promotion of product A is said to "cannibalize" product B's marketing performance.

On the other hand, under some circumstances, a market driver for product A might have a beneficial effect on the marketing performance of product B. For example, a marketing campaign for product A might incidentally increase sales of a product B if both product A and product B are complementary (e.g. razors and razor blades).

Thus, to factor in possible interrelationships between different market drivers for the same product, and interrelationships between different products, the Elixir module 214 defines input variables that represent such possible interrelationships. Such defined interrelationships may then be included in tested candidate models to determine if any of the input variables representing such interrelationships (either between different market drivers for the same product, or between different products) has a significant effect on the marketing performance for the product(s) in question. If one or more such interrelationship variables are found to significantly contribute to such marketing performance, the iterative procedure, described below in greater detail, may result in the inclusion of one or more of those input variables in the final optimal marketing model for the product(s) in question.

Thus, the underlying data from the database and datamart server 212, and optionally the derived augmented data and generated input variables, are next used to select relevant market drivers and estimate coefficients, or some other parameters, of the market variables for a candidate model (at 430).

Figure 5:
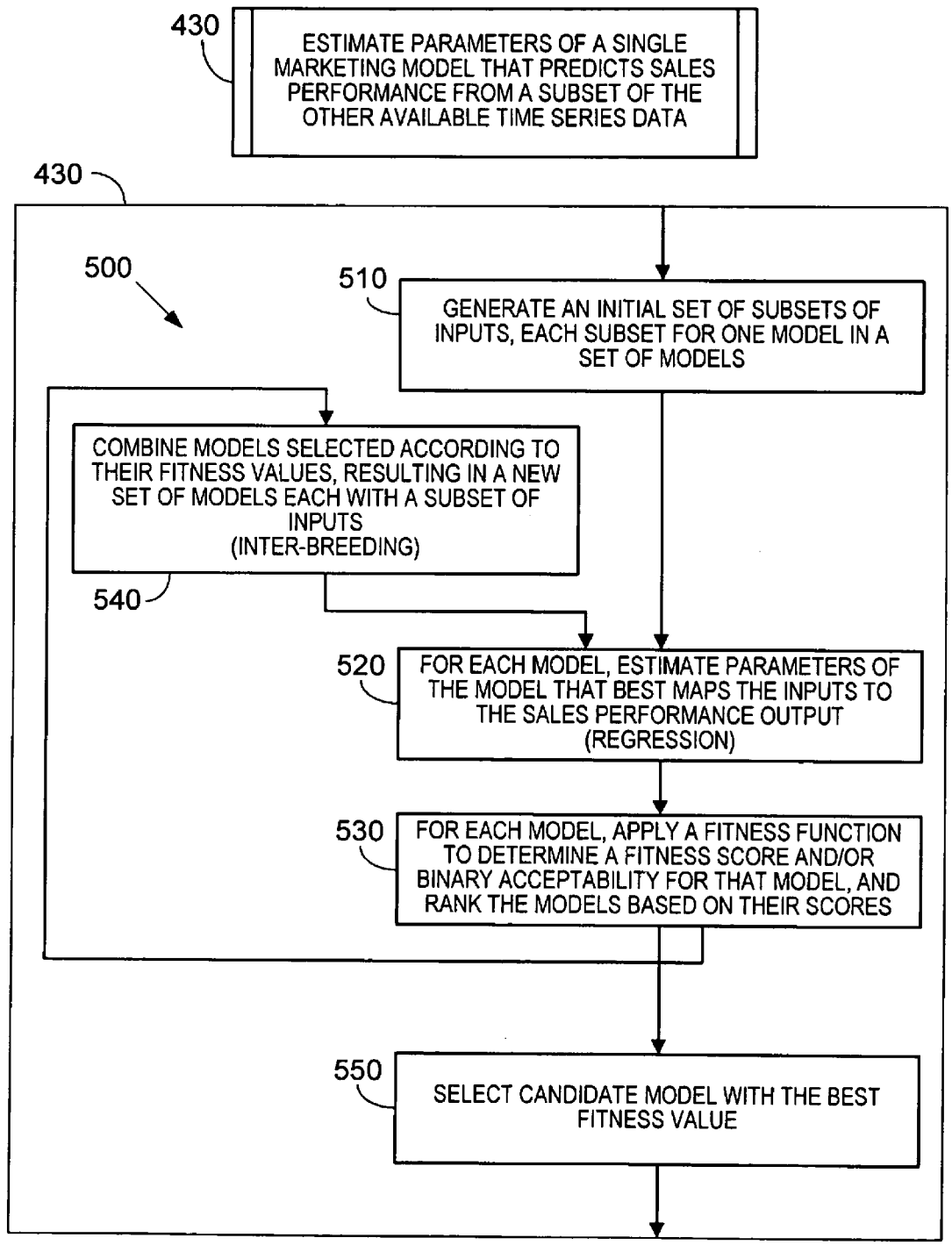
FIG. 5 is a flowchart of an exemplary procedure for generating marketing model candidates, and selecting an optimal marketing model.

FIG. 5 is a flowchart of an exemplary procedure 500 for generating marketing models candidates from which an optimal marketing model is selected. Note that until the last part of the procedure (block 550), multiple models are concurrently handled. At the last part, the single "best" model is finally selected. The procedure 500 uses Genetic Algorithm (GA) optimization to determine candidate models. Specifically, the selection of the relevant model market drivers follows a GA approach. Given a selected subset of model drivers, a statistical regression (e.g., linear regression) approach is used to determine the model coefficients.

As shown, the Elixir module 214 generates, at 510, a set of subsets of market driver inputs for the products and/or services (i.e., for the sales performance time series) with respect to which a marketing model is be generated. Each subset includes input data corresponding to a set of market drivers from which a candidate model could be generated. In this version of the system, the number of market driver inputs may be predetermined and/or fixed for all the models. Selection of the subset of input market drivers, and any augmented data derived by the module 214 at 420 of FIG. 4, is based on meta data records from data group 318. As previously described, the meta data records specify plausible sets of market drivers that affect the performance of particular products and/or services. The selection of the subsets of input market drivers may also be based on random selection of market drivers. Additionally, the selection may also include derived input variables, such as the Adstock-type input variables having corresponding memory decay behavior, and also input market variables representing interrelationships between different marketing drivers for the same product, and/or input variables representing interrelationships between the marketing performance of different products.

The Elixir module 214 thus produces a plurality of subsets of inputs corresponding to various market driver permutations that affect the performance of the products and/or services for which a model is to be generated.

For each of the subsets initially generated at 510, the Elixir module 214 estimates, at 520, coefficients for the market variables of the model that best maps the input of the market drivers (corresponding to the market variables) to the corresponding performance data. Estimation of the coefficients of the market variables for a candidate model is performed using regression techniques to produce multi-variable functions (e.g., curves) that best fit the computed output of the given input data to its corresponding output. In some embodiments the regression techniques perform non-linear regression for at least some of the market variables of the candidate model to account for any non-linear behavior associated with such variables (e.g., market variables that display diminishing returns behavior).

Thus, the Elixir module 214 produces an initial set of candidate models, each corresponding to a different subset of input market drivers. For each of the generated models, the Elixir module 214 uses a fitness function, retrieved from the fitness function/constraints module 220, and applies that fitness function, at 530, to produce a score (scalar or vector), that is representative of the fitness, or adequacy, of the particular model generated.

The retrieved fitness function determines, for example, the size of the error between the computed output of the candidate model and the actual historical performance data corresponding to that input. An examples of an error measure that can be computed by the fitness function is the root-mean-square error.

A suitable fitness function for evaluating candidate models makes use of one or more of the following characteristics:

1. Modeling fit to the historical data.
2. Domain-dependent fit of the coefficients. For example, the fitness function penalizes models that produce paradoxical responses to certain inputs. For example, the fitness function assigns a lower score to a model that produced an increase in sales volume of a particular product in response to a price increase for that product.
3. Statistical significance. The fitness function strongly favors statistically significant variables. Thus, models that have fewer market variables (representing market drivers), and in which the contribution of those fewer variables to the output of the model is significant (as may be determined by a pre-defined threshold indicative of what would be a significant contribution) would be favored over complex models having variables that marginally contribute to the performance of the candidate models. The fitness function also penalized models displaying serial correlation of errors and models having a serial correlation of errors, which may be evidence of model misspecification. Also the fitness function may penalize multicollinearity in the model, which may suggest that the selection of market drivers is not optimal.

The extent to which a fitness function used assigns a particular score based on the above criteria is pre-determined by operators of the system 200. The actual weights or scores that a fitness function attaches or assigns to a particular criterion may vary for different situations. For example, there may be circumstances where the optimal model is anticipated to have a large number of variables. Under those circumstances the fitness function employed would place less weight on the complexity of the model when assigning a score representative of the fitness of the model.

Additionally, for each of the generated candidate models the Elixir Module 214 also determines if the candidate model complies with the constraints stored in the module 220.

Once the fitness scores for the generated candidate models have been produced, and every model has been checked to ensure that it satisfies the various specified constraints, the remaining models (i.e., those models not eliminated for failing to satisfy the constraints) are ranked according to their respective fitness scores. It should be noted that the initial set of possible candidate models may include a large number of models (e.g., 2000-10000 models). To expedite the process of determining the optimal model, some of the initially generated models may be eliminated, thereby leaving only the more promising generated candidate models for further processing. Thus, in some embodiments the Elixir module 214 eliminates 50% of the models having the worst fitness scores.

Subsequently, the Elixir module 214 combines the surviving models, according to their fitness scores, to produce a new set of interbred models (at 540). The interbreeding process is implemented using genetic algorithm approaches. Typically, in GA an initial population of candidate solutions (in this case, the surviving candidate models) is interbred using two basic operations: crossover (recombination), and mutation. In a crossover operation, the elements of the interbred solution (in this case, the market variables, and their corresponding coefficients) are swapped. The occurrence of the crossover operation for two solutions may be predicated on some probabilistic event. Typically, genetic algorithm approaches use a crossover probability of between 0.6 and 1. Thus, the Elixir module 214 may include a random event generator in which some particular event (e.g., the generation of the number 1) has an associated probability. Accordingly, candidate models may be interbred only if the event in question has first occurred.

In a mutation operation, a resultant combined model (i.e., the offspring of interbred candidate models) is mutated by replacing one or more of its elements (e.g., market variables) with other elements. Here too, the mutation operation may be predicated on some probabilistic occurrence. Typical mutation probabilities may be on the order of 0.01 or less.

As noted, selection of candidate models for interbreeding is performed according to the models' respective scores, and therefore there is a bias to interbreed the high ranking models while disregarding the lower ranking models. However, such an approach can cause convergence to a sub-optimal or local solution. Thus, in some embodiments the interbreeding process can include selection of low ranking candidate models. Some suitable candidate selection techniques that select lower ranking candidate models include the roulette wheel selection technique, and/or the tournament selection technique.

To further prevent convergence to a sub-optimal or local solution, the Elixir module 214 generates additional candidate models corresponding to a subset of input market drivers in a manner similar to the generation of the initial set of candidate models described with respect to block 510. The selection of the subsets with respect to which candidate models are generated may again be based on the meta data records stored in meta data group 318.

Once an iteration of the interbreeding process and the generation of further candidate models from market driver subsets has completed, the resultant models are processed using a regression technique at 520 to estimate the market variable coefficients. The Elixir module 214 then evaluates the candidate models using the previously used fitness function (or some other fitness function) and/or the specified constraints, ranks the candidate models according to their corresponding fitness score, and selects the more promising candidate models to be used for further iterations of the procedure shown in blocks 520, 530 and 540.

The Elixir module 214 repeats the iterative procedure described with respect to blocks 520, 530 and 540 until a particular condition is met. In some embodiments the procedure is repeated until one candidate model produces a fitness score that exceed some pre-defined threshold (in situations where a high score is indicative of high fitness). In some embodiment the procedure shown in 520, 530 and 540 may be repeated a pre-determined number of times (e.g., 20 iterations). Other conditions or criteria for controlling the number of iterations that are to be performed to generate candidate models may be used.

Once the Elixir module 214 has completed its iterations for generating candidate models, the Elixir module 214 selects at 550 the candidate model having the best fitness score as the optimal model.

Generally, the optimal model selected has the following characteristics:

1. The values representing the model's response for a given market driver input should be consistent with real-world marketing behavior. Thus, an input representing an increase in advertising expenditure should result in a non-negative performance improvement (i.e., the performance for the product or service should either remain the same or improve, but should not deteriorate).

2. The marketing variables of the model (representing the subset of market drivers chosen for the optimal model) should be statistically significant. Specifically, contribution of the variables to the performance of the model should exceed a pre-defined threshold. This model characteristic reflects the fact that the model should not have variables whose contributions to the model's performance is negligible. In some embodiments, the pre-defined statistical significance threshold may be 10%. In some embodiments the threshold may be 5%. Lower or higher statistical significance thresholds may be used according to the level of complexity desired for the model.

3. The model should include, where appropriate, model variables representing market drivers corresponding to competitors' data. For example, marketing models for products marketed in competitive markets, such as the automobile market, should include model variables reflecting the behavior of competitors (e.g., competitors' research and development expenditures, competitors' advertising expenditures, etc.).

4. The model should reflect realistic temporal delays in the response of the model to a change to some or all of the market drivers. Thus, if there is an increase to the level of expenditure of some of the market variables, the model should reflect the fact that the response to that increase may be delayed and/or staggered over time.

5. Where appropriate, the response to some marketing variables should be non-linear (e.g., a change to the input of a non-linear market variable would not result in proportional change to the response of the model). For example, well-known marketing phenomena, such as diminishing returns, should be taken into account when. If empirical data shows that non-linear behavior occurs over specified ranges, the behavior of the model, with respect to the market variable causing the non-linear behavior, should reflect such piecemeal behavior of the market variable.

6. The market model should include appropriate macro/demographic variables (e.g. interest rates at Home Depot). The inclusion of such macro variables would be contingent on such variables having sufficient statistical significance.

7. The market model should have an overall substantial "fit". For example, the error measure of the model should be reasonably high and "visual" fit should be acceptable.

Turning back to FIG. 4, the selected optimal model, having a determined set of market variable and corresponding coefficients, is stored in the models data group 319 on the database and datamart 212 (at 440). Additionally, if the selected optimal model includes input variables representing interrelationships between different marketing drivers for the same products, and/or input variables representing interrelationships between different product (as more particularly explained above), those variables and their determined coefficients are stored in an interrelationship table. Such an interrelationship table may also be stored on the database and datamart 212. The input variables and coefficients stored in the interrelationship table are subsequently used for resource optimization, as will be described below in greater detail.

As previously noted, the optimal model generated corresponds to particular products and/or services. The Elixir module 214 may be used to generate additional optimal models, using procedures 400 and 500 shown in FIGS. 4 and 5 for other products and/or services. Additionally, the Elixir module 214 may also be used to determine optimal models in relation to a set of products and services in a particular geographic locale, and/or for a particular market channel.

FutureView Marketing Parameter Adjustment Module

The optimal model determined by the Elixir module 214 is based on historical data that relates past input market drivers (i.e., past marketing actions) to past sales performance outcomes resulting from those past actions. Accordingly, to make marketing predictions using that model it is necessary to adjust the optimal model so that its behavior would accurately reflect changing marketing conditions rather than the old marketing conditions with respect to which the model was generated. The FutureView module 216 enables the operators of the system 200 to adapt the optimal model so that it can be used to predict the future outcomes in response to future inputs.

As shown in FIG. 3, the FutureView module 216 is an interactive module that uses input from one or more users to determine how behavior (i.e., performance) of the optimal model would change in response to a change to the underlying market drivers. The input from the users is solicited using survey questions stored on survey/slider question storage 330, and presented to the one or more users using an interface (not shown) connected to model adaptation module 332.

Figure 6:
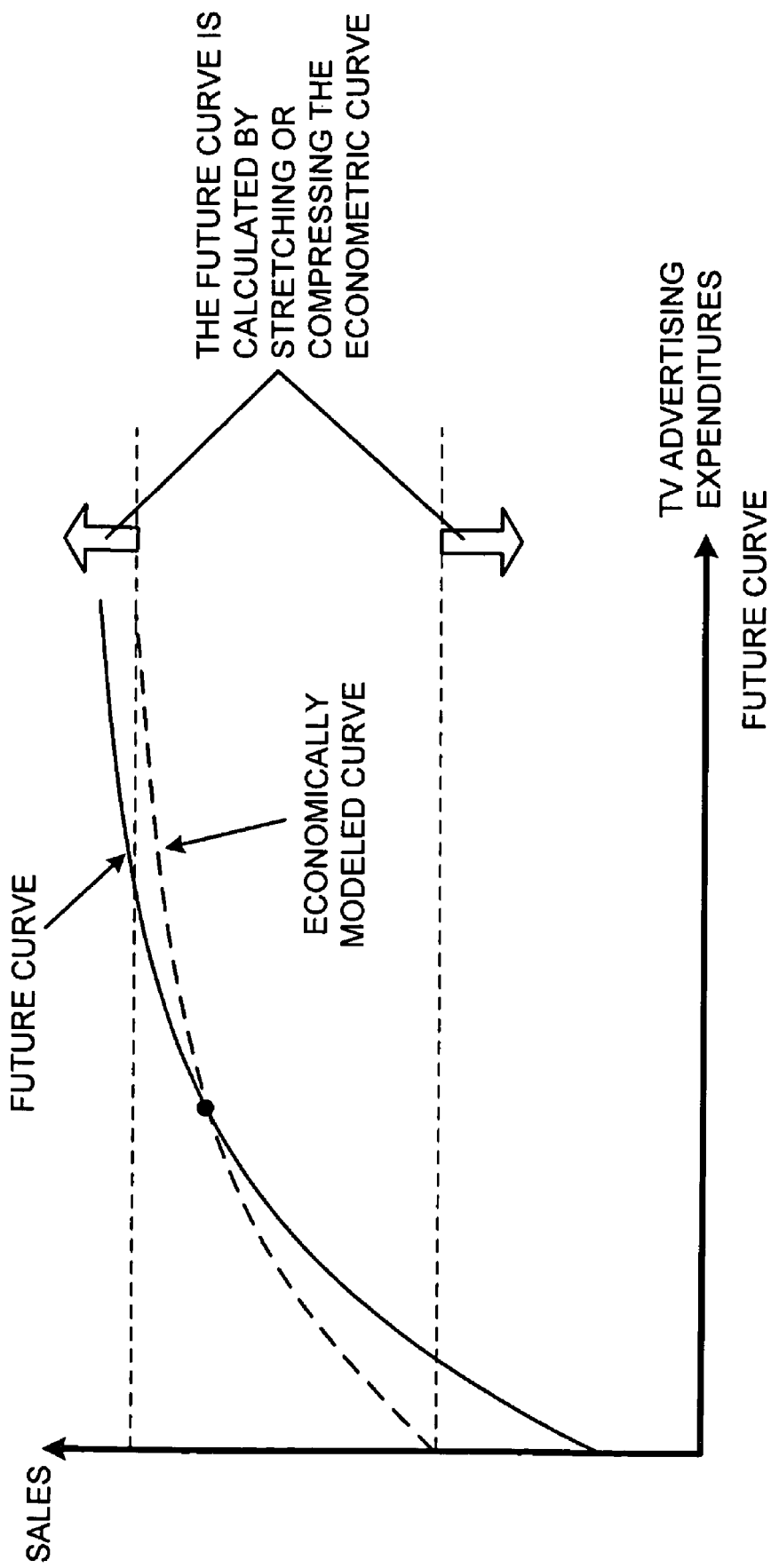
FIG. 6 is a response curve that illustrates the sales performance of a model as a function of a single market driver.

Traditionally, analysts often experienced difficulties in predicting how the performance of a marketing or economics model would change in response to a change of the input of the model's market drivers. The difficulty lay in the fact that it is difficult to identify the market driver factors that impact the model's response, and the fact that it is difficult to quantify how the overall response of the model would change as a result of such changes to the market drivers. The FutureView module 216 overcomes that difficulty in two ways. First, the FutureView module 216 examines the marginal impact a change of the input of a market driver would have on the behavior of the model in isolation from other market drivers. That is, individual market variables (or drivers) are examined independently of other market drivers to determine how the performance of the model is affected by a change to that market driver. The marginal change to the performance of the model can be represented graphically using a response curve. FIG. 6 is a response curve that illustrates graphically the sales performance of a model as a function of a single market driver. In FIG. 6 the illustrated market driver is TV advertising expenditures.

The second way by which the FutureView module 216 simplifies the model adaptation process is by creating for every market driver a set of simple questions that enables the user to consider the multiple facets and factors of each market driver. Thus, instead of having to consider in the abstract the potential impact a particular market driver would have on the behavior of the model, a user only needs to consider several simple questions whose combined effect corresponds to the overall impact on the model by that single market driver.

Figure 7:
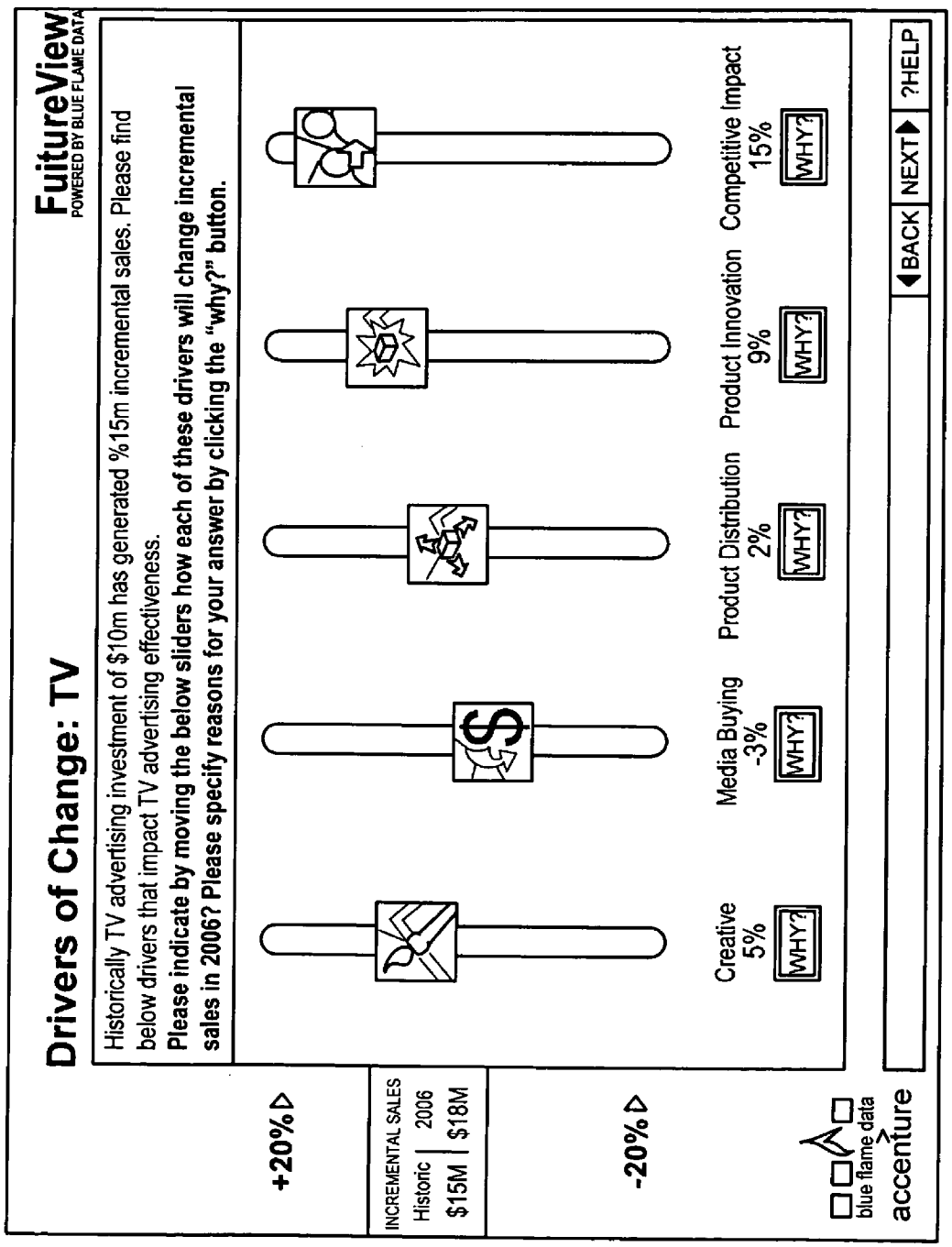
FIG. 7 is an exemplary display presented to a user to solicit the user's input to questions pertaining to a market driver.

FIG. 7 is an exemplary display from a user interface presented to a user to solicit the user's input to questions pertaining to a market driver. As shown at the top of FIG. 7, the market driver being considered is the effect of TV expenditures on the incremental sales performance. As can be seen, a user is not asked to simply predict the overall effect, in terms of absolute values, this market driver would have on the performance of the model. Making such predictions is generally difficult to do, and in any event such absolute predictions tend to be inaccurate and unreliable. Instead, the user is asked to quantify, in terms of percentage contributions, how a number of listed factors corresponding to that market driver will affect the overall impact that market driver will have in the future on the performance of the model, relative to the model's historic behavior. Thus, users estimate future changes based on historic values. The users' input is then translated into absolute value by the FutureView module 216.

As can be seen in FIG. 7, some of the questions, or factors, corresponding to the TV advertising effectiveness include the impact the creativity of TV ads has on sales performance, the impact the product innovation has on the sales performance, etc. The user is also prompted to provide an explanation for the choices the user makes.

The responses provided by the user are subsequently used by the model adaptation module 332 to determine the composite effect those factors have on the corresponding market driver, thereby enabling the FutureView module 216 to determine how the response curve for that market driver should change. With reference again to FIG. 6, the composite effect of the various factors of the market driver is used to compute a scaling factor which can be used stretch the response curve or compress it, thereby generating a predictive response curve from a historical one. Stretching the vertical axis of the response curve indicates that the composite effect of the market driver factors resulted in an improved performance (i.e., the marginal response of the model to the market driver in question was such that the performance improved). As a result, the coefficients, or parameters, associated with the corresponding market variable of the model is adjusted accordingly to reflect the stretching of the response curve. Conversely, a compression of the response curve indicates that the performance of the model deteriorated in response to a change of the market driver in question.

Although FIG. 6 shows that the scaling is done with respect to vertical axis of the curve, scaling of the response curve can also be performed on the horizontal axis of the curve. When performed with respect to the horizontal axis, stretching of the curve indicates a degraded performance (e.g., higher expenditure is required to achieve the same performance level), while a compression of the curve along the horizontal axis is generally indicative of improved performance.

The model adaptation module 332 of the FutureView module 216 may similarly compute a re-scaling factor for the other market variables (e.g., for the other response curves) of a model. Thus, for every market variable (market driver), a list of simplified question is presented to one or more users, and the responses provided by the users are used to determine the composite effect a change of the corresponding input market driver would have on the marginal response of the performance of the model. That composite effect determined from the simplified questions is thus used to re-scale the response curve, thereby enabling a re-adjustment of the coefficient(s) of the corresponding market variable.

Figure 8:
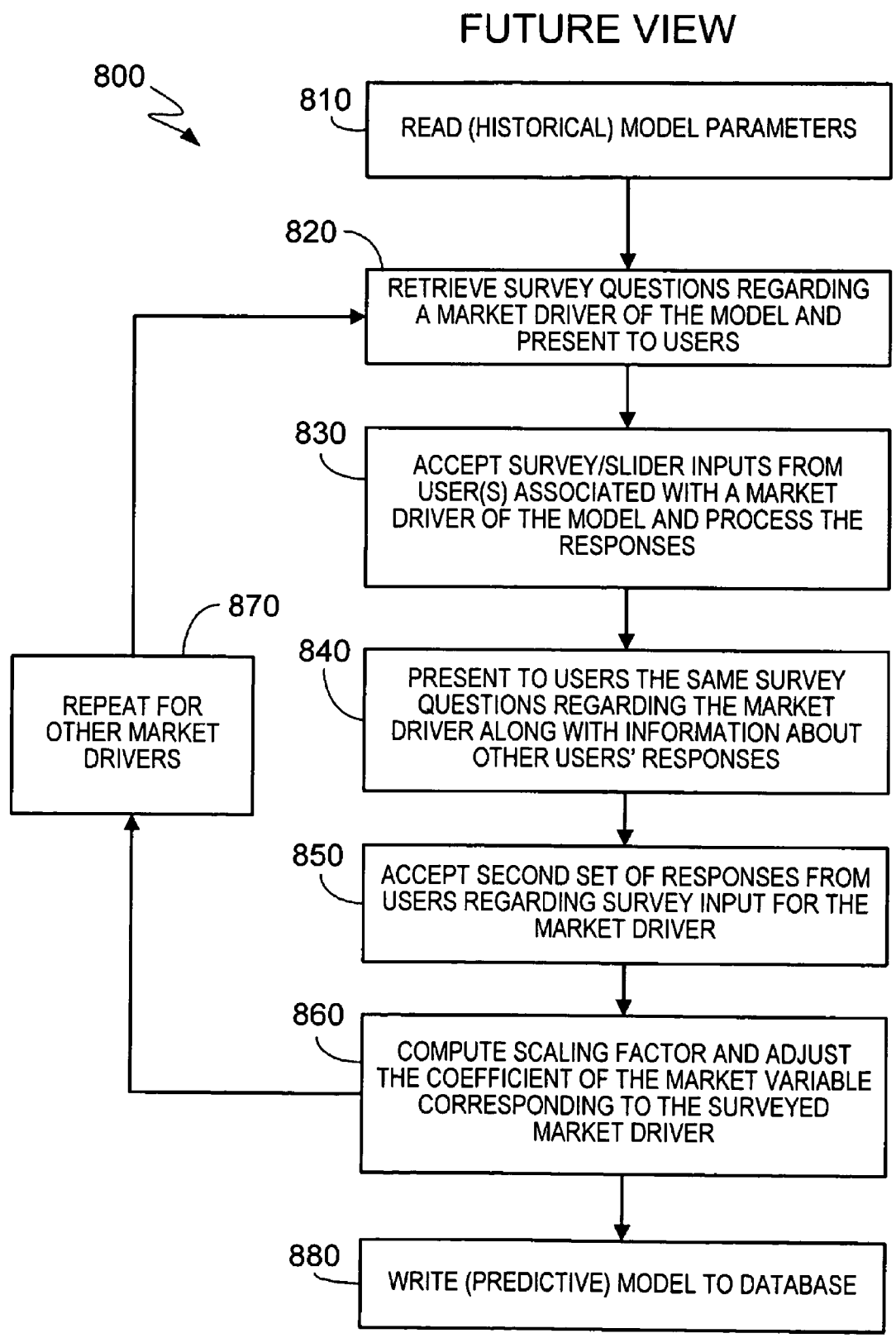
FIG. 8 is a flowchart of an exemplary model adaptation procedure for generating predicted models.

FIG. 8 is a flowchart of the model adaptation procedure 800 performed by the FutureView module 216. As shown, the FutureView module 216 reads at 810 a particular optimal model (i.e., one that was derived from historical data) from the database and datamart 212. The retrieved model represents performance outcome as a function of several market variables having coefficients that were determined by the model generation procedures 400 and 500 performed by the Elixir module 214. The retrieved model includes estimated response curves generated from the optimal model and corresponding to the market variables of the optimal model. Next, the FutureView module 216 retrieves at 820 survey questions associated with one of the market variables of the retrieved optimal model, and presents those survey questions to one or more users. The survey questions are retrieved from the Survey/Slider Question module 330 of the FutureView module 216. Alternatively, the various survey questions may be retrieved from the database and datamart 212.

The retrieved survey/slider questions may be presented to the users through graphical user interfaces displayed on computer consoles accessed by the one or more users. For example, the graphical user interfaces may be web-based interfaces implemented using HTML or Java script. Accordingly, the FutureView module 216, or one of the systems interconnected to it, may include a server configured to send survey questions in one or more formats supported by the graphical user interface executing on the computer consoles that the one or more users uses.

The users consider the questions presented to them, and respond accordingly. The responses include indications of the future contribution of the various factors affecting one or more of the model's market variables, and/or explanations regarding the users' choices. The responses are sent back to the FutureView module 216. The FutureView module 216 accepts at 830 the users' responses. Using its model adaptation module 332, the FutureView module 216 processes the response and determines a representative response based on the users' individual responses. The compiled representative response includes, for example, the average, or median value for each factor or question presented to the users.

Next, the FutureView module 216 sends at 840 to the users who participated in the first round of the survey response (i.e., at 820) the same set of survey questions, along with the representative response compiled for each of the questions from the answers provided by the entire group of users. Each user is also provide with other data corresponding to the group's answers, such as the minimum and maximum responses provided. The specific response provided by a number of users (e.g., three users) may also be provided.

Figure 9:
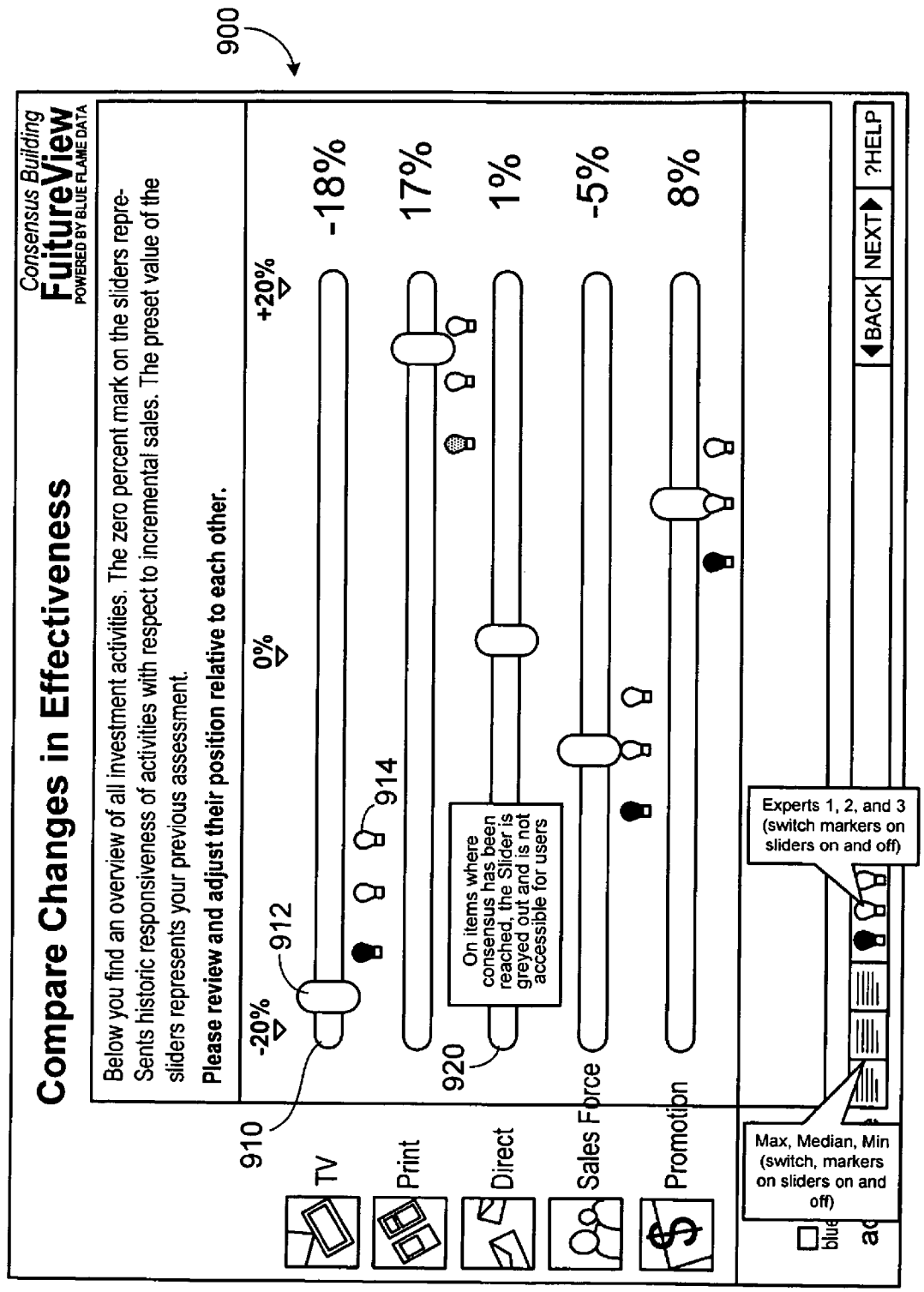
FIG. 9 is an exemplary survey slide provided to a user during a second round of a multi-round survey process.

FIG. 9 is an exemplary survey slide 900 provided to a user during a second round of the survey (the slider pertains to a different survey than the one shown in FIG. 7). As shown, the slider 910 includes graphical information showing the user's original answers (e.g., answer 912), markers showing the maximum, minimum and median responses of the group surveyed, as well as the specific answers of three (3) users (e.g., answer 914). The slider 920 has been grayed out, thus indicating that consensus on that particular issue or question has been reached.

The surveyed users are thus given an opportunity to change their earlier responses to one or more of the questions based on the responses other users have provided. By giving users an opportunity to view other users' responses and modify their own responses, the FutureView module 216 enables users to reach a consensus regarding the various factors/ questions associated with particular market variables. The process of providing surveyed users with an opportunity to modify their original responses based on other users' responses is known as a Delphi process. After the users have responded to the second round of the survey, the FutureView module 216 receives at 850 the users' second responses. Further rounds of surveying may be implemented.

The FutureView module 216 then uses the second responses obtained to compute a composite value representative of a scaling factor that is used to adjust the coefficient of the market variable in question (at 860). The computation of the scaling factor is carried out by the model adaptation module 332. The composite value may be determined using a pre-defined weight function that reflects how the factors of the particular market variable affect the variable's incremental effect on the response of the model. The determined scaling factor can be graphically represented as either compressing or stretching the response curve corresponding to the particular market variable. The scaling factor thus enables the computation of a predicted response curve from the historical response curve.

The FutureView module 216 determines at 870 whether there are other market variables for the model that have to be adjusted, and if there are, the FutureView module 216 repeats blocks 820-870 with respect to the next market variable.

Once the model's market variables have been adjusted, the adjusted model represents an adapted predicted model that relates future performance to future input. The adapted predicted model is then written back and stored at 880 in database and datamart 212. The predicted generated response curves may also be stored in the database and datamart 212.

Figure 10:
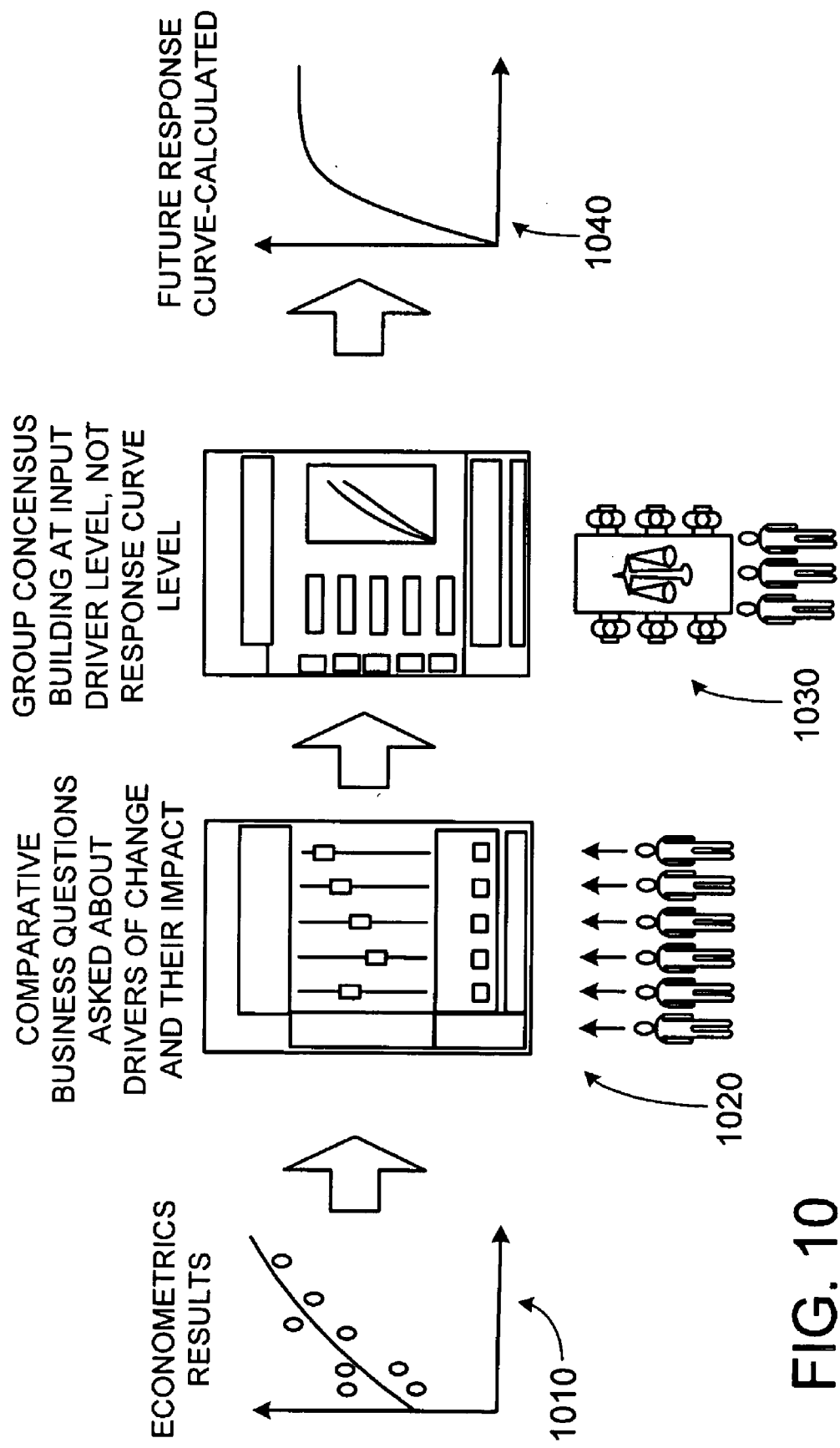
FIG. 10 is a graphical representation of the procedure shown in FIG. 8.

FIG. 10 is a graphical representation summarizing the procedure 800 performed by the FutureView module 216. As shown, at 1010 a marketing model is retrieved from the database and datamart 212. Business questions relating to each of the market drivers that constitute the retrieved model are then presented at 1020 to users using a graphical user interface. As shown, the questions are presented individually to each user, without the user having any knowledge, at that point, of the other users' responses.

Next, the individual users' responses are compiled, and representative response values are computed. The representative response is then presented to the individual users at 1030, thereby enabling them to reconsider their initial responses given other users' responses. Thus, the users' responses to the survey questions are not made, at this point, in isolation from other users. This process promotes consensus building, thereby resulting in more statistically stable and reliable responses. Group consensus is established with respect to the individual contributions that the listed factors for the market driver in question would have on the impact of that market driver on future performance of the model. Thus, the group consensus being sought is not intended to establish absolute values that would enable direct adjustment of the response curve corresponding to the market driver, but merely to establish consensus with respect to the contributions of that market driver's factors.

The responses obtained through the consensus building process are used to compute a scaling factor that is then applied to the response curve, at 1040.

Although typically the response curves that are adjusted using the procedure described herein are based on historical data, in some embodiments the original response curves that are to be adjusted may be based on other types of data For example, in some embodiments the original response curves (i.e., the underlying response curves that are adjusted by the FutureView module 216) are derived based on input from analysts.

Solomon Marketing Resources Optimization Module

The Solomon module 218 determines an optimization of marketing resources (e.g., monetary resources) based on derived models. Typically, such optimization is performed on predicted models generated using the FutureView module 216 since optimization actions are typically performed for future events. However, the Solomon module 218 is configured to also accept as input an optimal model derived based on historical data. Applying the Solomon module 218 to a historical optimal model(s) may be done for training purposes and for assessing past decisions of an entity's management.

The optimization procedure performed by the Solomon module 218 determines, among other things:

1) the optimal total budget to be spent on marketing activities by a particular entity (e.g., a company); and 2) the optimal allocation of that optimal total budget between the products, regions (e.g., countries), and/or marketing drivers with respect to which the budget is to be spent.

The Solomon module 218 determines the optimal allocation of marketing resources for one or more geographical regions, one or more products, and/or one or more marketing channels.

Figure 11:
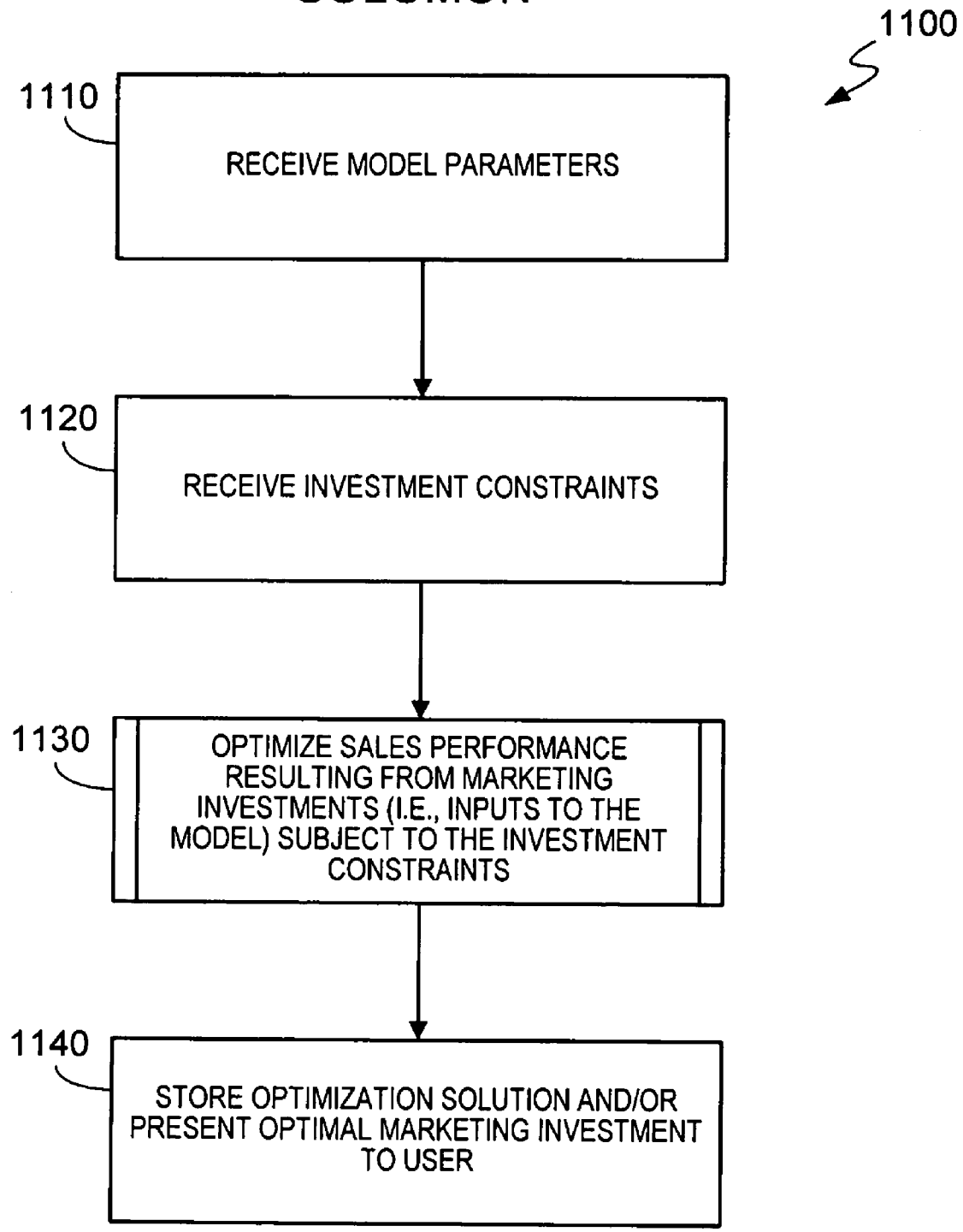
FIG. 11 is a flowchart of an exemplary procedure for optimizing an organization's marketing resources based on market models.

FIG. 11 is a flowchart of an exemplary procedure 1100 for optimizing an organization's marketing resources based on market models. Initially, the Solomon module 218 receives from database and datamart 212 one or more models, pertaining to one or more products and/or services, with respect to which the client wishes to optimize its resources. Generally, marketing resources have to be apportioned so as to promote and market several products and/or services. Thus, in some embodiments the optimization process needs to be performed with respect to several models. The Solomon module 218 also retrieves from the database and datamart 212 the interrelationship table that contains the input variables representing interrelationships between marketing drivers corresponding to the same product, and input variables representing interrelationship between different products. These input variables enable the Solomon module 218 to automatically adjust interdependent response curves during the optimization procedure.

The Solomon module 218 also retrieves at 1120 investment constraints. The investment constraints represent conditions about how resources are to be allocated. For example, a constraint could specify that the advertising budget cannot be entirely earmarked for a single product and/or publication. Such a constraint may specify that certain minimum thresholds must be met in the allocation of a marketing resources to particular items. The list of constraints may be retrieved from the database and datamart 212. Alternatively, the list of constraints may be stored on dedicated storage connected to the marketing resource optimization module 340 of the Solomon module 218, and subsequently retrieved from that storage.

As will be described in more details below, the constraints to be used by the Solomon module 218 can be specified by a user interacting with the Solomon module 218 using the dashboard interface 234. The user can thus control which models optimization is to be performed on, what constraints the optimization process cannot breach, the size and nature of the marketing resources to be optimized, etc. The dashboard interface therefore enables the user to interactively direct the optimization process performed by the Solomon module 218.

Having received the models (as well as a list of input variables indicative of inter-dependencies between marketing drivers and between models corresponding to different products), and the corresponding sets of constraints, the Solomon module 218 next performs a marketing resources optimization process, at 1130, to optimize sales performance from marketing investments, subject to the received constraints.

Figure 12:
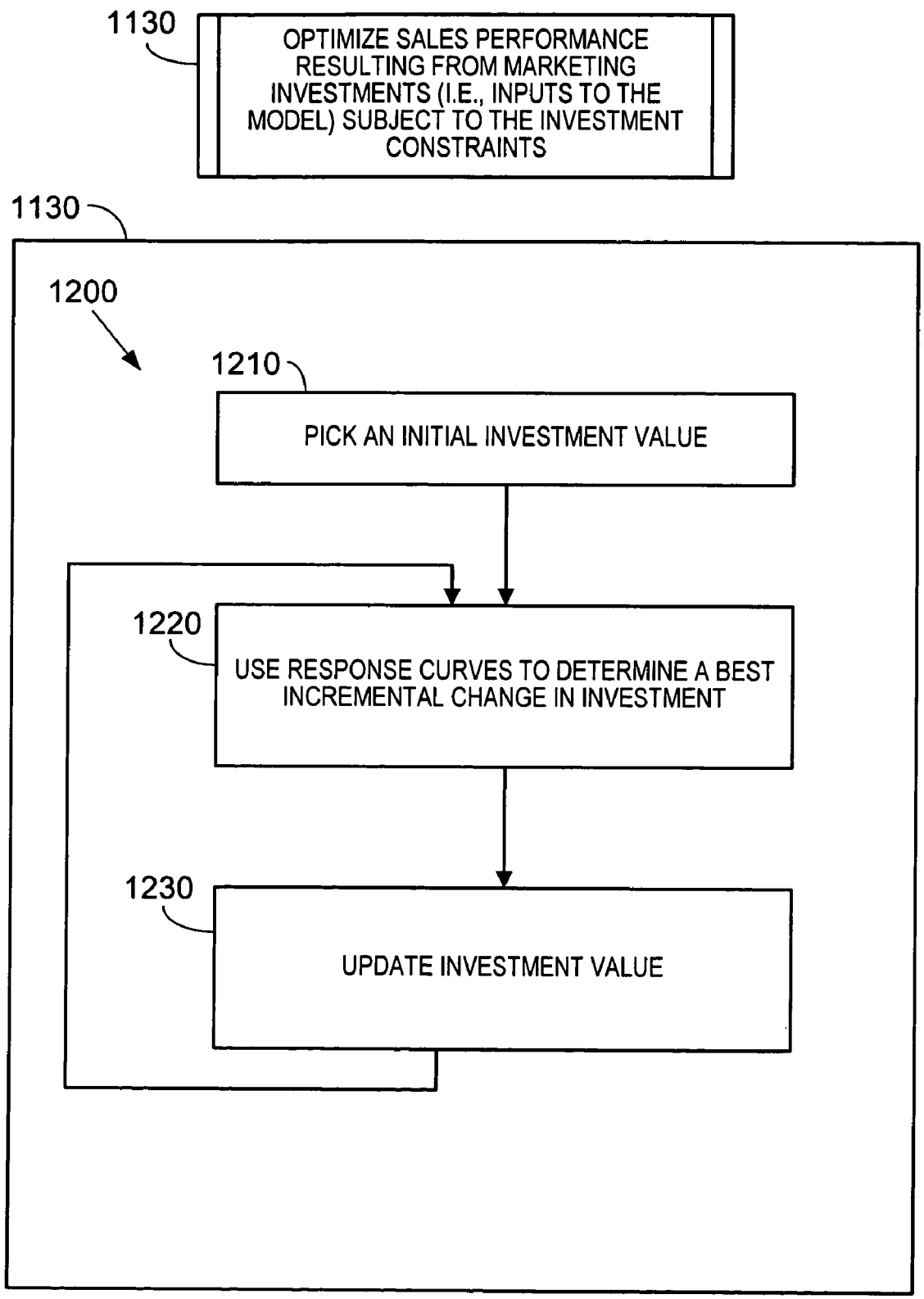
FIG. 12 is a flowchart of an exemplary procedure for iteratively determining marketing investments that optimize performance.

FIG. 12 is a flowchart of an exemplary procedure 1200 for iteratively computing marketing investments that optimize performance. The Solomon module 218 picks an initial investment value, at 1210, from which it will iteratively and incrementally converge to a marketing resources optimization solution. The initial value represents the minimum value to be allocated for marketing resources. This value may be specified in one of the constraints retrieved by the Solomon module 218, or it may be provided by a user interacting with the Solomon module 218 through the marketing investment planning interface 234 of the dashboard 230 (as shown in FIGS. 2 and 3).

Once an initial investment has been picked, the Solomon module 218 begins the iterative optimization process shown in blocks 1220 and 1230. To determine the marketing resources optimization, the Solomon module 218 uses at 1220 response curves to determine a best change in investment. The Solomon module 218 determines the best incremental investment to the initial budget which would yield, for that incremental investment, the best performance improvement The Solomon module 218 therefore examines a market variable of the retrieved model and computes, for the incremental change, the corresponding performance improvement from the variable's corresponding response curve.

The Solomon module 218 similarly examines each of the marginal responses for each of the model's other market variables (as determined from those market variables response curves), and thereby identifies which incremental change yields the best performance outcome. The market variable providing the best response for the incremental change is thus allocated that incremental change in investment, and the Solomon module 218 accordingly updates the investment value at 1230 with that incremental change. The investment update performed at 1230 includes an update to the overall marketing resources investment value, and an indication of which market variable of the model the incremental change has been allocated to. This intermediate result may be stored in the market resource optimization module 340, or it may be stored on the database and datamart 212.

During the determination of how to allocate the incremental change of investment being considered, the Solomon module 218 ensures that the constraints the optimization process is subjected to are not breached. For example, suppose the constraints specify that the maximum resources allocated to TV ads cannot exceed $1 M. If the incremental change being considered would cause the TV ads expenditure to exceed $1 M then that incremental change cannot be allocated to the TV ads market variable, notwithstanding that the Solomon module 218 may determine that allocating this incremental change to TV ads yields the best performance results.

Additionally, as noted above, the market resource optimization process is typically performed with respect to multiple products/services corresponding to various models. Accordingly, when determining the expected performance result for an incremental change of a marketing variable, the marginal responses of the performances of all the various models have to be considered. Thus, if an incremental change of one market variable causes a significant performance improvement for one model, but causes a significant performance degradation to another model, then the allocation of the incremental change to that particular market variable may not be the optimal incremental change in investment.

Accordingly, the Solomon module 218 uses the interrelationship table previously compiled to determine if a change to the marginal response of one market driver corresponding to a first product would affect the marginal responses (and thus the marketing performances) of one or more other products with respect to which the resource optimization is being performed. Additionally, the Solomon module also determines at this point whether the particular change to the marginal response being considered would affect the marginal response(s) corresponding to different marketing drivers for that same first product.

For example, if the interrelationship table lists an input variable representing an interrelation between the marketing driver being considered and another marketing driver for the same product, the Solomon module 218 would thus automatically evaluate the marginal response for that other inter-dependent marketing driver. If the evaluation indicates an improvement in performance (in other words, the interrelationship between the affected marketing drivers is one based on the Halo Effect), this would increase the likelihood that the incremental change being considered is indeed the optimal incremental change. On the other hand, an evaluation of the marginal response of an inter-dependent marketing driver resulting in a degradation of the marketing performance for that product, would make it less likely that the incremental change being considered is the optimal change.

Similar evaluations are also performed with respect to inter-dependent products. Specifically, in accordance with identified input variables in the interrelationship table that represent the interrelationships between two or more products, the Solomon module 218 automatically evaluates the marginal responses for inter-dependent products to determine what effect the incremental change considered for a first product will have on the performance corresponding to the inter-dependent products.

Once the investment value has been updated at 1230, the Solomon module 218 repeats the procedure for the next incremental change. The process continues until the maximum value for the marketing resource investment has been reached. That value may also be specified as one of the constraints that the optimization process is subjected to. Other criteria for terminating the optimization process may also be used.

The Solomon module 218 is configured to determine if the optimization process has deviated from an optimal path, and to correct itself if it has to so as to return to a path leading to the optimal solution. For example, during the optimization process certain incremental changes may be selected that, while providing good marginal performances, nevertheless lead to a local performance maximum. A local performance maximum is a point where the model's performance cannot be improved no matter how the next incremental change of investment is allocated. Such local maxima occur before the maximum investment value has been reached (e.g., the local maximum is $2M, although the total available resources are $10M). Under those circumstances, the Solomon module 218 can reverse course by retracting the most recent incremental change allocations, and determining whether different allocations may lead to different paths that ultimately would cause a convergence towards the true optimal solution.

Turning back to FIG. 11, once the optimal total budget and the corresponding optimal marketing resources allocation have been determined, the Solomon module 218 stores the determined optimized solution in the database and datamart 212, and/or presents the solution to one or more users using the marketing investment planning interface 234 of the dashboard 230.

Dashboard

Turning back to FIGS. 2 and 3, dashboard 230 enables a user to interact with the Evolution system 210, and to receive from the Evolution system 210 data and information collected or generated by the Evolution system 210. The data sent by the Evolution system 210 is displayed on an the dashboard interface. As shown in FIG. 3, the dashboard 230 includes two interfaces.

Figure 13:
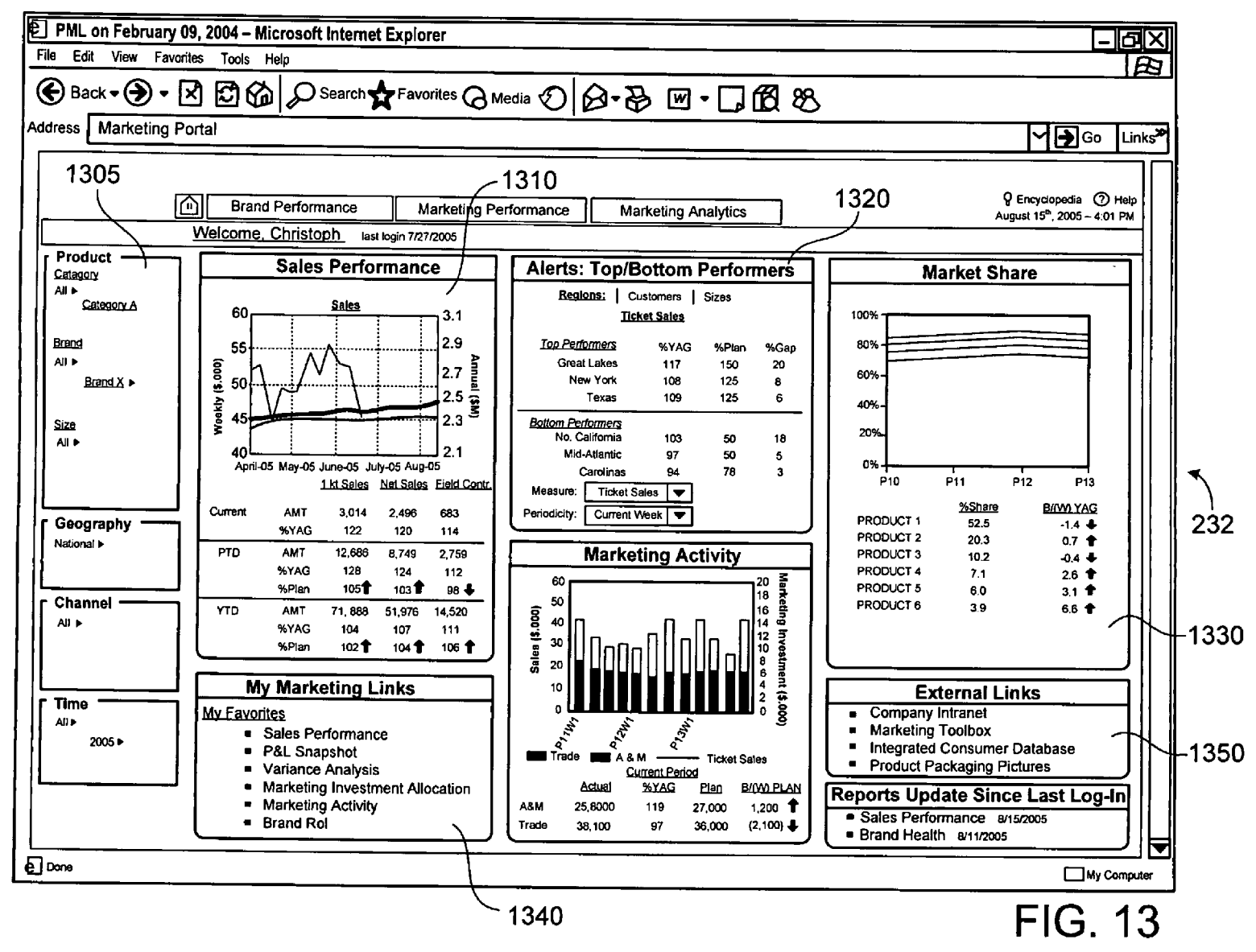

FIG. 13 is an exemplary embodiment of a reporting interface 232 of the dashboard 230. Reporting interface 232 is configured to display data received from the database and datamart 212. The data received and displayed on the reporting interface 232 includes the market driver data stored in the data group 310, performance data stored in data group 312, competitor data stored in the data group 314, and all other types of data provided by third-party providers stored, for example, in the environment data group 316. Thus, as shown in FIG. 13, the reporting interface 232 includes area 1310 which provides performance data for the product indicated in area 1305. The area 1305 provides information regarding the various marketing attributes pertaining to the indicated product, including the category of the product, the trademark associated with the product, the region in which the product is being marketed, the time frame corresponding to the data presented by interface 232, etc.

The reporting interface may also be configured to present other useful performance information. For example, as shown in FIG. 13, the top performing regions, as well as the bottom performing regions (in terms of sales) are presented in area 1320 of the reporting interface 232.

In addition, the reporting interface 232 is also configured to display models and response curves stored on the database and datamart 212 (not shown in FIG. 13). Additionally and/or alternatively, the reporting interface 232 may be configured to directly generate response curves from models retrieved by the interface, thereby enabling a user to directly manipulate response curves for simulation purposes.

The reporting interface 232 is additionally configured to present real-time market information (e.g., stock prices, and other market activities and events). The reporting interface 232 can thus be connected to other servers providing real-time information that is then displayed for the user's benefit. Thus, for example, area 1330 of the reporting interface 232 includes the current market share and trends information for the product indicated in area 1305 of the interface 232, as well as for other products.

The reporting interface 232 is further configured to display lists indicating additional presentation options available to the user. Thus, area 1340 of the interface 232 lists various analysis and presentation tools available to a user. For example, some of the analysis tools available include the variance analysis tool. Another option listed in area 1340 is the marketing investment allocation tool which, when selected, would present to the user a snapshot of the current allocation of marketing resources corresponding to the product identified in area 1305 of the interface 232 (e.g., advertising expenditures in various media). Also available on the interface 232 is the external links list 1350 providing the user with links to external resources.

The reporting interface 232 is configured to display the retrieved data in various formats, including graph format, pie-chart format, etc. Thus, as shown in area 1310 of FIG. 13, the sales performance data is presented in a graph format. The reporting interface 232 is further configured to enable a user to manipulate data, and store it back in the database and datamart 212.

The dashboard 230 may further enable a user to configure the reporting interface 232 so that the user may display desired data in locations and formats that are most convenient and conducive to the user.

Figure 14:
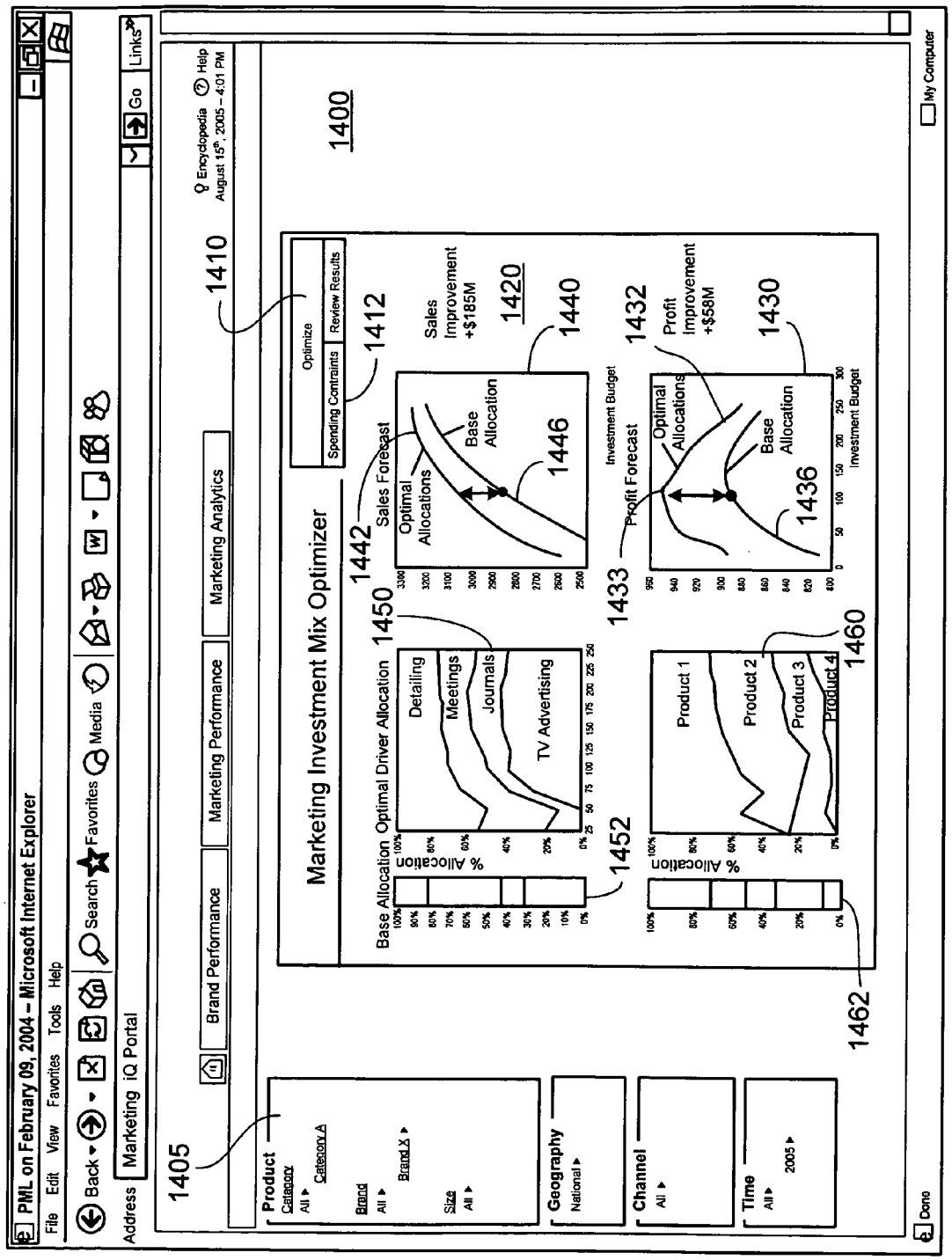
FIG. 14 is a screenshot of an exemplary display for initiating the optimization process of FIG. 11, and for displaying the results of that optimization process.

The dashboard 230 also includes the marketing investment planning interface 234. FIG. 14 is a screenshot of an exemplary display 1400 of the investment planning interface 234 for initiating the optimization process to be performed by the Solomon module 218, and for displaying the results of that optimization process. As can be seen, the display 1400 includes area 1405 in which information pertaining to the product for which marketing optimization is to be carried-out is displayed. The area 1405 thus displays information such as the category of the product, the trademark associated with the product, the region in which the product is being marketed, the time frame corresponding to the data to be presented in display 1400, etc.

To launch the optimization process, the user may click the "Optimize" button 1410 on the display. Thereupon, the interface 234 sends data, such as constraints specified by the user, to the Solomon module 218, and instructs the Solomon 218 to begin the optimization process (as described above). To specify constraints, such as pre-determined budgetary allocations, minimum and maximum investment values (i.e., permissible investment ranges, either in the aggregate or for individual market drivers), etc., the user may click on the "Spending Constraints" button 1412, thus causing the "What-If" display 1500 (see FIG. 15) to be invoked. As will be described in greater detail below, display 1500 enables a user to, among other things, specify allocation constraints.

After the Solomon module 218 has completed the optimization process, it sends the results to the dashboard 230, whereupon the results are graphically displayed in the result area 1420 of the interface 234. Particularly, the displayed results include graph 1430. The graph 1430 includes the optimal allocation profit curve 1432. The curve 1432 shows the projected profits, as determined by the Solomon module 218, for different marketing investment levels. As can be seen from the curve 1432, the maximum of that curve, namely maximum point 1433, identifies the optimal total investment that would result in the maximum marketing performance (when performance is measured by profits). As can be seen, the highest profit level is obtained at a marketing investment level of approximately $120M.

For comparison purposes, the graph 1430 also includes the base allocation curve 1436. The base allocation curve 1436 shows the relationship between profits and investment levels for pre-determined marketing investment allocations. In some embodiments the base allocation curve, and its corresponding marketing investment allocation levels, may have been based on historical figures. For example, the base allocation curve may correspond to the budgetary allocation used in the previous year, or it may correspond to the originally planned investment for the up-coming year.

A comparison of optimal allocation curve 1432 and base allocation curve 1436 shows that the optimal allocation determined by the Solomon module 218 would result in an increased profit level of $58M, even though the total investment in marketing activities is lower than the ideal total marketing investment indicated by the base allocation curve 1436 (approximately $160M).

Also presented in the display 1400 is the sales forecast graph 1440 which presents the projected sales revenues for the optimal allocation as determined by the Solomon module 218 (curve 1442), versus the sales revenues corresponding to the base allocation (curve 1446).

As further shown in FIG. 14, the display 1400 also presents data regarding the optimal allocations of the marketing resources for different marketing activities. Graph 1450, for example, provides the optimal allocation of marketing resources for different marketing activities, in terms of percentage values, as a function of investment budget levels. Accordingly, the optimal allocation of resources for marketing activities that corresponds to a $120M investment level (determined to be the optimal investment level from graph 1430), may be thus obtained from graph 1450.

Similarly, the optimal allocation of marketing resources by products is provided by graph 1460.

For comparison purposes, the base allocation values that were used to derive the base allocation curve 1436 are also provided. Specifically, the graph 1452 indicates the base allocation of marketing resources by marketing activities, whereas the graph 1462 indicates the base allocation of marketing resources by products.

Figure 15:
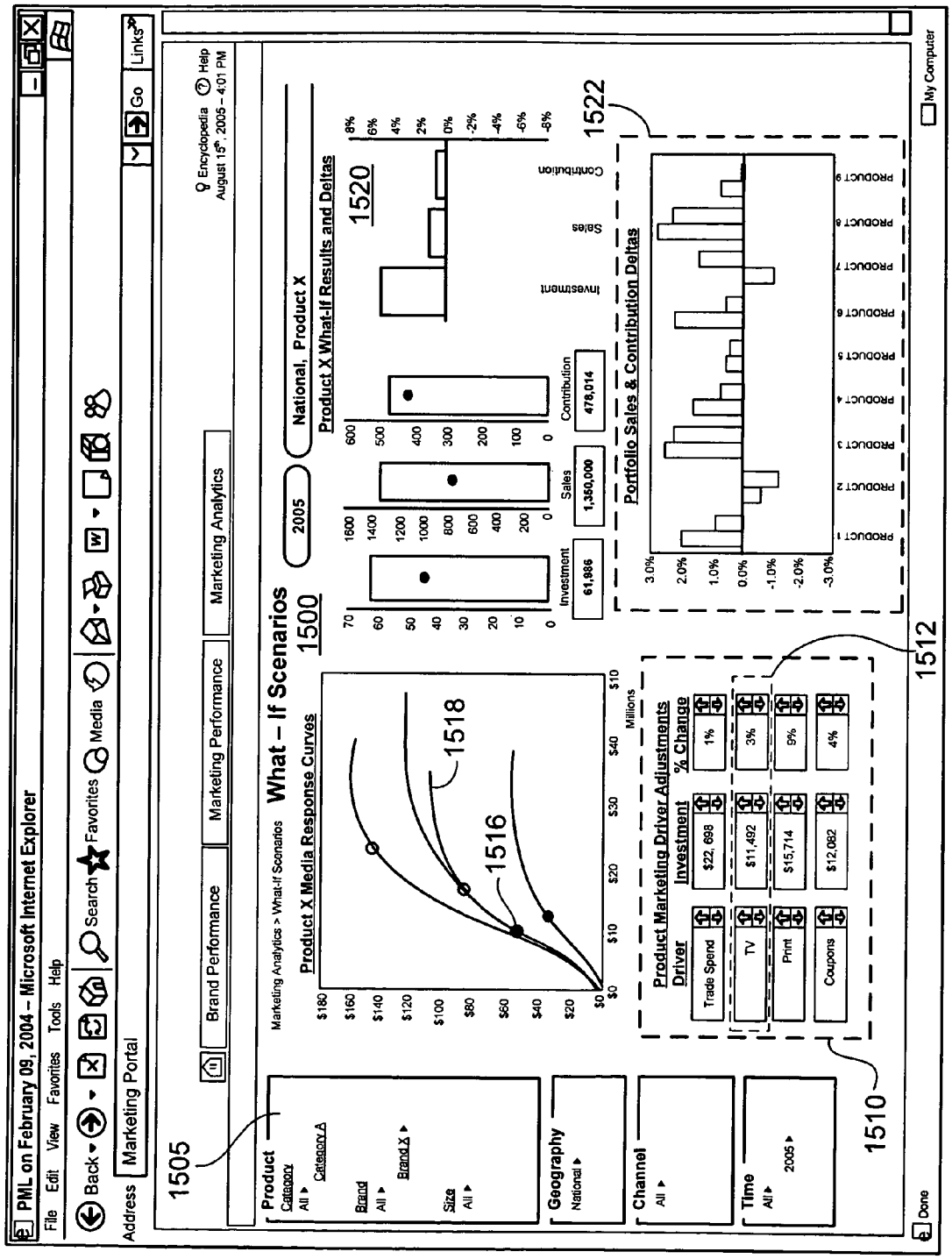
FIG. 15 is a screenshot of an exemplary dashboard marketing investment planning interface.

As previously described, the planning interface 234 is also configured to enable a user to interact with the Solomon module 218, and provide it with input that includes constraints, scenarios for simulations that are to be executed on the Solomon module 218, etc. The Solomon module 218 may subsequently determine the optimal allocation of resources based on the input provided by the user. FIG. 15 is a screenshot of an exemplary screen 1500. This input screen 1500, sometimes referred to as the "What-If" interface, enables the user (e.g., an analyst or executive) to specify the type of activities and their corresponding budgetary allocations that the user wishes to test to determine how those allocations would affect the performance of a model. For example, a user may allocate a certain percentage of available market resources specifically to certain activities (regardless of whether such allocation would be optimal) and determine how that allocation would affect the performance of the model(s) being tested.

Thus, as shown in FIG. 15, the display screen 1500 includes area 1510 in which the user can specify the investment values the user wishes to allocate to particular market drivers corresponding to a product identified in area 1505. The area 1505 provides information regarding the various marketing attributes pertaining to the indicated product, including the category of the product, the trademark associated with the product, the region in which the product is being marketed, the time frame corresponding to the data presented in the display 1500, etc. To specify the change to a market driver, the user may specify at, for example, 1512 the investment value for TV advertising. The user may either specify the investment value in absolute dollar figures (e.g., $11,492), or in terms of a percent increment with respect to the previous level of investment for that market driver. If the user specifies an absolute dollar figure, the interface 234 automatically adjusts the corresponding percentage change accordingly, and vice versa.

The interface 234 also uses the "What-If" screen 1500 to graphically display the investment allocations specified by the user on the corresponding response curves. For example, the budgetary allocation of $11,492 for TV spending is indicated by the point 1516 on the response curve 1518 that corresponds to the TV spending market driver. The interface 234 is also configure to display other budget allocation prompts, corresponding to other market drivers, to enable the user to specify constraints for those market drivers.

Once the budgetary allocation constraints have been specified, the information is submitted to the Solomon module 218. The Solomon module 218 then determines the optimal marketing resource allocation given the constraints imposed by the user. As noted above, the user initiates operation of the Solomon module 218 from display 1400 by clicking on the Optimize button 1410.

As further shown in FIG. 15, the display 1500 may also be configured to include information comparing the performance of the product to other products. Thus, for example, area 1520 of interface 234 shows how marketing investment changes for a chosen product (Brand X) influences the marketing performance of other products. For example, as shown by chart 1522, some products, namely Product 2 and Product 7, are adversely affected (i.e., the cannibalization effect) as a result of the marketing allocation determined in response to user imposed budgetary constraints. On the other hand, other products, like Product 6 and Product 8, are beneficially affected (i.e., the Halo effect) as a result of the allocation determined in response to the budgetary constraints imposed by the user.

As with interface 232, the interface 234 is configured to enable a user to store information received or determined by the interface 234 into the database and datamart 212.

In some embodiments the reporting interface 232 and planning interface 234 are implemented as graphical user interfaces displayed on a local or remote computer console accessed by the user. For example, the graphical user interfaces may be web-based interfaces implemented using HTML or Java script. Thus, in such embodiments the dashboard 230 may include a server configured to send properly formatted data to the computer accessed by the user.

In some embodiments, the two interfaces may be implemented as a single interface (e.g., a graphical user interface) divided into two sections corresponding respectively to the reporting interface 232 and the marketing investment planning interface 234.

OTHER EMBODIMENTS

The methods and systems described herein are not limited to a particular hardware or software configuration, and may find applicability in many computing or processing environments. The methods and systems can be implemented in hardware, or a combination of hardware and software, and/or can be implemented from commercially available modules applications and devices. Where the implementation of the systems and methods described herein is at least partly based on use of microprocessors, the methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for automatically processing marketing and sales information, the method comprising:
   selecting a response curve from among multiple response curves associated with an optimized marketing model, wherein the multiple response curves each identify a historical sales performance outcome for a product relative to a single, respective marketing input driver, and wherein the optimized marketing model is optimized based on iteratively generating multiple candidate models, and evaluating the candidate models using one or more fitness functions;
   obtaining survey questions for the respective marketing input driver associated with the selected response curve, the survey questions soliciting responses that, when combined, quantify, in terms of percentage contributions, an extent to which changes to past conditions of the marketing input driver will affect an overall impact of the marketing input driver on the selected response curve at a future time, wherein the responses are quantified numerically and are combined by selecting an average or median value;
   obtaining the responses to the survey questions from multiple analysts;
   combining the responses to the survey questions from the multiple analysts;
   determining a scaling factor for the selected response curve based on the combined responses;
   generating, by one or more processors, an adapted optimized model based on applying, using one or more processors, the scaling factor to the selected response curve;
   determining an allocation of marketing resources using the adapted optimized model; and
   presenting information that identifies the allocation of marketing resources.

2. The method of claim 1, wherein presenting the information further comprises presenting the information using a dashboard.

3. The method of claim 1, further comprising performing marketing simulation using the allocation.

4. The method of claim 1, further comprising:
   generating a user interface which, for each survey question, displays the survey question, and which includes a slider bar for each condition for the analyst to quantify the extent to which the changes to the past condition will affect the overall impact.

5. The method of claim 1, further comprising:
   determining, from the responses from the multiple analysts, a representative, maximum, minimum, average, or median value for each condition;
   re-presenting the survey questions to the multiple analysts, along with the representative, maximum, minimum, average or median value for each condition; and
   responsive to re-presenting the set of survey questions, allowing each analyst to adjust their own responses,
   wherein the scaling factor is determined using the adjusted responses.

6. The method of claim 5, wherein re-presenting the set of survey questions further comprises:
   generating a user interface which, for each survey question, displays the survey question and the maximum, minimum, and representative values for each condition, and which includes a slider bar for each condition for the analyst to adjust the extent to which the changes to the condition will affect the overall impact.

7. A computer storage medium encoded with a computer program, the program comprising instructions that when executed by data processing apparatus cause the data processing apparatus to perform operations comprising:

selecting a response curve from among multiple response curves associated with an optimized marketing model, wherein the multiple response curves each identify a historical sales performance outcome for a product relative to a single, respective marketing input driver, and wherein the optimized marketing model is optimized based on iteratively generating multiple candidate models, and evaluating the candidate models using one or more fitness functions;

obtaining survey questions for the respective marketing input driver associated with the selected response curve, the survey questions soliciting responses that, when combined, quantify, in terms of percentage contributions, an extent to which changes to past conditions of the marketing input driver will affect an overall impact of the marketing input driver on the selected response curve at a future time, wherein the responses are quantified numerically and are combined by selecting an average or median value;

obtaining the responses to the survey questions from multiple analysts;

combining the responses to the survey questions from the multiple analysts;

determining a scaling factor for the selected response curve based on the combined responses;

generating an adapted optimized model based on applying, using one or more processors, the scaling factor to the selected response curve;

determining an allocation of marketing resources using the adapted optimized model; and presenting information that identifies the allocation of marketing resources.

8. The computer storage medium of claim 7, wherein presenting the information further comprises presenting the information using a dashboard.

9. The computer storage medium of claim 7, wherein the operations further comprise performing marketing simulation using the allocation.

10. The computer storage medium of claim 7, wherein the operations further comprise:

generating a user interface which, for each survey question, displays the survey question, and which includes a slider bar for each condition for the analyst to quantify the extent to which the changes to the past condition will affect the overall impact.

11. The computer storage medium of claim 7, wherein the operations further comprise:

determining, from the responses from the multiple analysts, a representative, maximum, minimum, average, or median value for each condition;

re-presenting the survey questions to the multiple analysts, along with the representative, maximum, minimum, average or median value for each condition; and responsive to re-presenting the set of survey questions, allowing each analyst to adjust their own responses, wherein the scaling factor is determined using the adjusted responses.

12. The computer storage medium of claim 11, wherein re-presenting the set of survey questions further comprises:

generating a user interface which, for each survey question, displays the survey question and the maximum, minimum, and representative values for each condition, and which includes a slider bar for each condition for the analyst to adjust the extent to which the changes to the condition will affect the overall impact.

13. A system comprising:

one or more computers; and a computer-readable medium coupled to the one or more computers having instructions stored thereon which, when executed by the one or more computers, cause the one or more computers to perform operations comprising:

selecting a response curve from among multiple response curves associated with an optimized marketing model, wherein the multiple response curves each identify a historical sales performance outcome for a product relative to a single, respective marketing input driver, and wherein the optimized marketing model is optimized based on iteratively generating multiple candidate models, and evaluating the candidate models using one or more fitness functions, obtaining survey questions for the respective marketing input driver associated with the selected response curve, the survey questions soliciting responses that, when combined, quantify, in terms of percentage contributions, an extent to which changes to past conditions of the marketing input driver will affect an overall impact of the marketing input driver on the selected response curve at a future time, wherein the responses are quantified numerically and are combined by selecting an average or median value, obtaining the responses to the survey questions from multiple analysts;

combining the responses to the survey questions from the multiple analysts, determining a scaling factor for the selected response curve based on the combined responses, generating an adapted optimized model based on applying, using one or more processors, the scaling factor to the selected response curve, determining an allocation of marketing resources using the adapted optimized model, and presenting information that identifies the allocation of marketing resources.

14. The system of claim 13, wherein the operations further comprise:

generating a user interface which, for each survey question, displays the survey question, and which includes a slider bar for each condition for the analyst to quantify the extent to which the changes to the past condition will affect the overall impact.

15. The system of claim 13, wherein the operations further comprise:

determining, from the responses from the multiple analysts, a representative, maximum, minimum, average, or median value for each condition;

re-presenting the survey questions to the multiple analysts, along with the representative, maximum, minimum, average or median value for each condition; and responsive to re-presenting the set of survey questions, allowing each analyst to adjust their own responses, wherein the scaling factor is determined using the adjusted responses.

16. The system of claim 15, wherein re-presenting the set of survey questions further comprises:

generating a user interface which, for each survey question, displays the survey question and the maximum, minimum, and representative values for each condition, and which includes a slider bar for each condition for the analyst to adjust the extent to which the changes to the condition will affect the overall impact.

17. The system of claim 13, wherein the operations further comprise performing marketing simulation using the allocation.

* * * * *